United States Patent [19]

Colley

[11] Patent Number: 4,459,259
[45] Date of Patent: Jul. 10, 1984

[54] DIGITAL COMPUTER OPERATION OF A NUCLEAR REACTOR

[75] Inventor: Robert W. Colley, Richland, Wash.

[73] Assignee: The United States of America as represented by the United States Department of Energy, Washington, D.C.

[21] Appl. No.: 393,286

[22] Filed: Jun. 29, 1982

[51] Int. Cl.³ .............................................. G21C 7/36
[52] U.S. Cl. .................................. 376/216; 376/217; 364/492
[58] Field of Search ............... 376/216, 217; 364/527, 364/492

[56] References Cited

U.S. PATENT DOCUMENTS

| | | | |
|---|---|---|---|
| 2,553,603 | 5/1951 | Peters | 315/272 |
| 3,423,285 | 1/1969 | Curry | 376/217 |
| 3,518,654 | 6/1970 | Vassil | 340/228 |
| 3,752,735 | 8/1973 | Musick | 376/217 |
| 4,016,034 | 4/1977 | Musick | 376/216 |
| 4,075,059 | 2/1978 | Bruno | 376/217 |
| 4,080,251 | 3/1978 | Musick | 376/216 |
| 4,129,475 | 12/1978 | Spurgin | 376/216 |

Primary Examiner—Donald P. Walsh
Attorney, Agent, or Firm—Robert Southworth, III; Richard E. Constant; Michael F. Esposito

[57] ABSTRACT

A method is described for the safe operation of a complex system such as a nuclear reactor using a digital computer. The computer is supplied with a data base containing a list of the safe state of the reactor and a list of operating instructions for achieving a safe state when the actual state of the reactor does not correspond to a listed safe state, the computer selects operating instructions to return the reactor to a safe state.

3 Claims, 6 Drawing Figures conceivable failures to be addressed by a procedure. The time estimated for this is much shorter because it is conceived to be part of the system design process. Using current procedures, an operator may be prevented from going on to the highest level of cognitive activity when this is required because of the decision tree nature of the current procedures. This highest level of mental activity is known as knowledge based and allows for human judgment to solve problems which were not ever conceived of prior to their occurrence. By using the method of the present invention, the operator is unburdened from following a decision tree procedures and may more readily proceed to this highest level of mental effort when required.

To understand the control (feedback) loop of a system it is first important to define a "system." A system is an orderly arrangement of interrelated components that act and interact to perform some task or function in a particular environment and within a particular time period. The requirements of a system are that there be: (1) more than one component, (2) an orderly arrangement of the components, (3) interaction between the components, and (4) a functional purpose.

In order to control a system it must be well understood. Preparing a narrative functional description of the system (including the environmental and time constraints), the subsystems, functions and the components composing each for all modes of operation is a necessary first step. A reliability diagram for each system mode of operation should next be drawn. This will show the operational requirements down to the component level for the system.

The information to be provided is: (1) the number of modes of operation of the system, (2) the number of subsystems, (3) the number of functions composing the system and subsystems, (4) the number of components in each function, (5) the arrangement of components in parallel and/or series units, (6) the operational requirements of the component arrangement with or without redundancy, i.e. 2 out of 3 operational in parallel, and (7) the number of component states as operating, operational or failed (or maintenance).

This is the information required to determine equipment lineups and status that are acceptable operating system Markov Process states for each system mode of operation. Such states may be called the Established States (ES) for the system and the present invention may be called Sequencing Established States (SES).

A fundamental premise of the present invention is that the operational status of the system's equipment directly determines the possible acceptable system's process states. A process state is the physical parameters; i.e. pressures, temperatures, flows, that imply the system's state variables. The definition of the system's equipment for discussion of the invention is equipment that can be controlled by the operator. This controllable equipment consists of components such as pumps, motors, fans, electrical breakers, valves, etc. Items such as piping, tanks and vessels are not considered although it is possible to include them.

The system state, i.e. the physical parameters such as pressure, temperature and flow, is assumed to be directly correlated with the operational status of the system's components that contribute to the overall system function. For example, a pump will provide a driving head pressure, or a fan may provide forced draft cooling to maintain a constant temperature. If all the components are operable or operating according to the design specifications then the system should be operble or operating within the system's specified state limits.

The operational statuses of components are then the lowest level information required for the SES function. This information is represented by the following binary notation, (ab). The 'a' defines the status of the control switch for the component and 'b' defines the status of the component. The possible control switch statuses are:

0 for 'Off', rotating equipment, 'open', for electrical breakers, 'closed', for valves (note: for valves and breakers '0' denotes no flow path).

'1', for 'On', rotating equipment, 'closed', for electrical breakers, 'open', for valves (note: for valves and breakers "1" denotes a flow path).

'S' for 'Standby redundant' rotating equipment which automatically comes on line when an 'on line' unit is detected to have failed.

'M', for a 'maintenance' status of equipment, meaning the unit has been isolated from the system by administrative and/or physical means.

The possible statuses of the equipment are:

'0', for 'operable', rotating equipment, 'open' for an electrical breaker, and 'closed' for a valve.

'P', for 'operating' variable speed rotating equipment, 'operating' variable impedance electrical component, and 'operating' for a variable pressure drop or flow rate valve.

'F', for a 'failed' component.

The expected states of a component, such as pump, would be:

(00) component control is 'Off' and the unit is 'Off'
(0F) component control is 'Off' and the unit is 'Failed'
(11) component control is 'On' and the unit is 'On'
(1P) component control is 'On' and the unit is 'Operating'
(1F) component control is 'On' and the unit is 'Failed'
(S0) component control is 'Standby' and the unit is 'Off'
(S1) component control is 'Standby' and the unit is 'On'
(SP) component control is 'Standby' and the unit is 'Operating'
(SF) component control is 'Standby' and the unit is 'Failed'
(M0) component control is 'Maintenance' and the unit is 'Off'
(M1) component control is 'Maintenance' and the unit is 'On'

Note that other combinations such as (0P),(01), or (10) are possible. These, however, are considered failed states. The (M1) and (MP) states are not considered because units are usually not run isolated from the system.

Binary operations for all these element states are defined below where the resultants have the following interpretation:

'0'—'no change in component state required'
'1'—'a change of the component state is required'
"N"—'a transition between these states is not possible'.

(11).(1P)=1,  (1F).(1P)=N,  (00).(1P)=1, (SP).(1P)=1,
(11).(11)=0, (1F).(11)=N, (00).(11)=1, (SP).(11)=1,
(11).(1F)=N,  (1F).(1F)=0,  (00).(1F)=N, (SP).(1F)=N,
(11).(00)=1, (1F).(00)=N, (00).(00)=0, (SP).(00)=1,

DIGITAL COMPUTER OPERATION OF A NUCLEAR REACTOR

The United States Government has rights in this invention pursuant to Contract No. DE-AC14-76FF02170 between the U.S. Department of Energy and the Westinghouse Electric Corporation.

BACKGROUND OF THE INVENTION

The invention relates generally to a computerized control system for complex systems and, more particularly to a method for operating a nuclear reactor using a digital computer.

As a result of the events at the Three Mile Island nuclear power plant in Pennsylvania, much interest was created in the operational safety aspects of nuclear power plants. A problem which has become evident is the dependence upon written operating procedures.

Often human operators of any system have often looked at procedures as a hinderance more than a help in performing the function of system control. The reason procedures are not the useful guides they are intended to be is that they have never been able to cover all possible situations. Normal plant evolution procedures, such as system startup or shutdown, have the characteristic of a known starting and ending point. These normal procedures tend to be complete and accurate.

The problem with operating procedures arise in connection with off-normal failure states. We cannot know the particular failures that will occur before they happen, therefore, the particular scenario is unknown before hand. Since the starting point is unknown a complete written procedure would have to consider all failures and all the possible combinations. Current procedures are generally written for single component failures for the simple reason that the set of all possible failures and combinations of system states with failures is very large. It is, therefore, extremely difficult or near impossible to write a general procedure to accommodate all possible failure combinations.

To avoid this difficulty in the past (and present) the failures that were most probable or which had unacceptable consequences were defined. Procedures for these "standard accidents" or scenarios were written. This is clearly only a partial set of procedures. The root cause of procedures being scorned would then apparently be that current procedures are only a partial set of rules which do not cover all possible events. Currently an operator is required to search a procedure decision or "response" tree to determine if instructions for a particular situation exist, if found they can be executed. If the procedure for the system does not cover the specific situation, the operator has to evaluate whether or not an acceptable state exists which can be reached using normal plant controls or if an acceptable state can only be reached by abnormal plant control actions. This allows many opportunities for 'operator error.' The source of these 'operator errors' may be operator overload under stressful conditions.

It is, accordingly, a general object of the invention to provide a method for the explicit control of a complex system such as a nuclear reactor in order to enhance safety.

It is a further object of the invention to provide a method for safe control of a nuclear reactor which is not dependent upon exhaustive written procedures which cover every conceivable combination of component failure.

Other objects, advantages and novel features of the invention will be apparent to those of ordinary skill in the art upon examination of the following detailed description of a preferred embodiment of the invention and the accompanying drawings.

SUMMARY OF THE INVENTION

A method is provided for the explicit operation of a complex system such as a nuclear reactor using a digital computer to enhance safe operation. The computer is first provided with a data base containing a list of the safe states of the system or reactor and a list of operating instructions for component state changes which are combined to form a procedure which will achieve a safe system or reactor state. Repetitively, the actual states of the individual reactor components are determined and compared with the list of safe system or reactor states. When, because of component failure or otherwise, the actual system state changes, the computer searches the list to determine the next safe state the system can achieve. The computer then selects operating instructions from its list to required to achieve the next safe system state. Finally, the instructions are ordered to form a procedure in which the instructions are listed in a proper sequential order.

DESCRIPTION OF A PREFERRED EMBODIMENT

Figure 1:
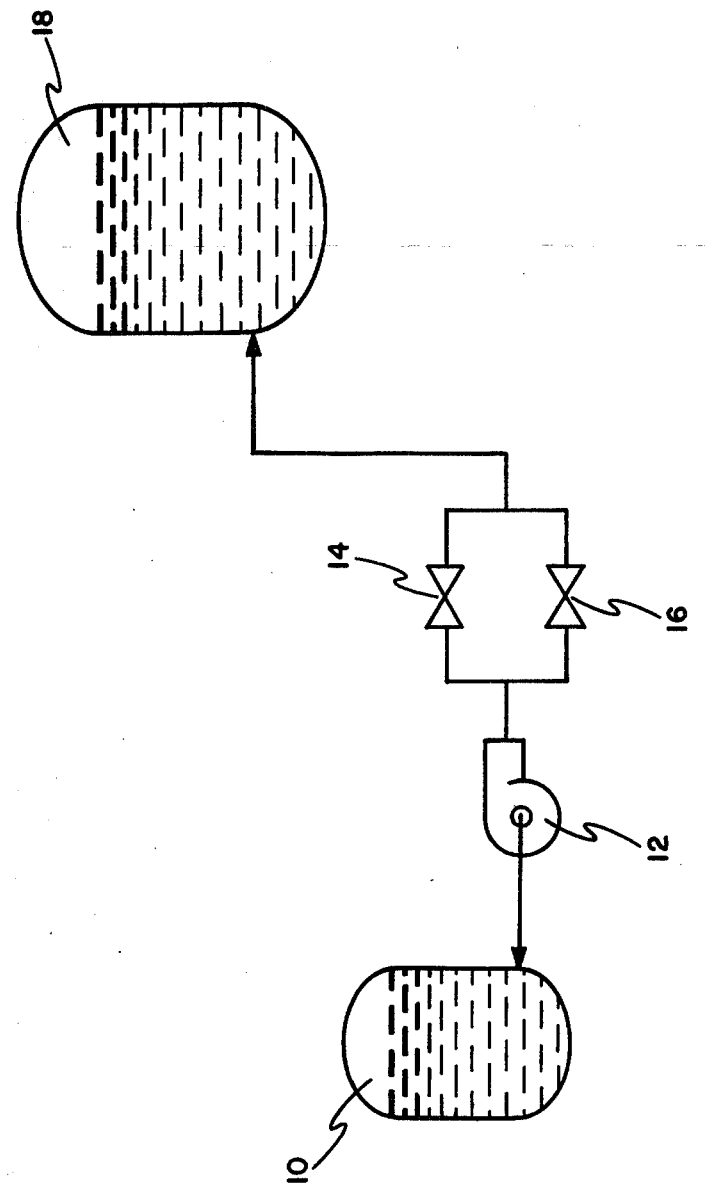
FIG. 1 is a flow diagram of a simple pumping system.

To put the present invention in perspective, it is convenient to discuss a model of the functions required to be performed by a control system and the mental activities of a human operator in performing these functions. A human operator's mental activity may be termed as knowledge, rule, or skill based. The skill based activity corresponds to those activities which are ordinarily reflex actions and are routinely performed by automatic equipment or humans without much time for thought or reflection.

The rule based activity corresponds to those decisions in which the control response time is longer and the operator's response can be guided using rules either memorized or set down in written procedures. These written procedures allow long, complex detailed sequences of actions to be performed. In a complex system such as a nuclear reactor, writing these procedures detailing only the most probable failures or high consequence and the prescribed manner in which to recover from such a failure can be extremely burdensome. It has been estimated that in one case 200 man-years of efforts were required to write such a procedure manual. The methodology of the present invention allows for all (11).(SP)=1,   (1F).(SP)=N,   (00).(SP)=1,
(SP).(SP)=0,
(11).(OF)=N,   (1F).(OF)=1,   (00).(OF)=N,
(SP).(OF)=N,
(11).(S0)=1,   (1F).(S0)=N,   (00).(S0)=1,
(SP).(S0)=1,
(11).(S1)=1,   (1F).(S1)=N,   (00).(S1)=1,
(SP).(S1)=1,
(11).(SF)=N,   (1F).(SF)=1,   (00).(SF)=N,
(SP).(SF)=N,
(11).(M0)=1,   (1F).(M0)=N,   (00).(M0)=1,
(SP).(M0)=1,
(11).(MF)=N,   (1F).(MF)=1,   (00).(MF)=N,
(SP).(MF)=N,
(OF).(1P)=N, (S0).(1P)=1, (S1).(1P)=1, (SF).(1P)=N,
(OF).(11)=N,   (S0).(11)=1,   (S1).(11)=1,
(SF).(11)=N,
(OF).(1F)=1, (S0).(1F)=1, (SF).(1F)=N,
(OF).(00)=N,   (S0).(00)=1,   (S1).(00)=1,
(SF).(00)=N,
(OF).(SP)=N,   (S0).(SP)=1,   (S1).(SP)=1,
(SF).(SP)=N,
(OF).(OF)=0,   (S0).(OF)=N,   (S1).(OF)=N,
(SF).(OF)=1,
(OF).(S0)=N,   (S0).(S0)=0,   (S1).(S0)=1,
(SF).(S0)=N,
(OF).(S1)=N,   (S0).(S1)=1,   (S1).(S1)=0,
(SF).(S1)=N,
(OF).(SF)=1,   (S0).(SF)=N,   (S1).(SF)=N,
(SF).(SF)=0,
(OF).(M0)=N,   (S0).(M0)=1,   (S1).(M0)=1,
(SF).(M0)=N,
(OF).(MF)=1,   (S0).(MF)=N,   (S1).(MF)=N,
(SF).(MF)=1,
(1P).(1P)=0, (M0).(1P)=1, (MF).(1P)=N
(1P).(11)=1, (M0).(11)=1, (MF).(11)=N
(1P).(1F)=N, (M0).(1F)=N, (MF).(1F)=1
(1P).(00)=1,   (M0).(00)=1,   (MF).(00)=N
(1P).(SP)=1, (M0).(SP)=1, (MF).(SP)=N
(1P).(OF)=N, (M0).(OF)=N, (MF).(OF)=1
(1P).(S0)=1, (M0).(S0)=1, (MF).(S0)=N
(1P).(S1)=1, (M0).(S1)=1, (MF).(S1)=N
(1P).(SF)=N, (M0).(SF)=N, (MF).(SF)=1
(1P).(M0)=1, (M0).(M0)=0, (MF).(M0)=N
(1P).(MF)=N, (M0).(MF)=N, (MF).(MF)=0

The representation of a function is by the binary states as follows: an acceptable function state for the current system or subsystem mode (indicated by a '1'), an unacceptable function state for the current mode (indicated by a '0'). The function state is determined by comparing the current validated function status to Established States (ES) for this function in the current system or subsystem mode.

The Established States are developed using combinatives. For example:

If the function consists of a series of L components then there will be L elements in the ES vector, one element describing each component's status. The number of ES will be $$\prod_{i=1}^{L} I_i,$$

where $I_i$ is the number of operating states for the $i^{th}$ component.

If the function consists of N parallel components, M of which are required to be operational or operating for the function to be acceptable, then there will be N elements in the ES vector, one element to described each component's status. The number of ES will be $$(N!)\left(\prod_{i=1}^{L} I_i\right)\left(\prod_{i=1}^{N-M} J_i\right) /M!(N-M)!$$

where $I_i$ is the number of operable/operating states for the $i^{th}$ of the M components, and $J_i$ is the number of non-operable states for the i of the (N−M) components.

This combinator logic can be extended to consider any combination of series and parallel components. It is, therefore, possible to write a general algorithm which will generate the acceptable states for a function of any configuration.

Just as the functions composing the subsystem or system are represented by binary bits, so can the subsystem and system. The subsystem (or system) can be considered as in an acceptable state for the system mode or in an unacceptable state for the system mode. The subsystem (or system) state is determined by comparing the current subsystem state to the established subsystem state for the system's mode of operation.

The established subsystem states are developed using combinatories as the function states were. Combining the subsystem and function states for each plant mode then gives the established states for the whole system. These basic relationships can be used for a generic algorithm which generates the system established states.

The SES methodology of the present invention sequences through the ES and compares each ES to the current Validated Component Status (VCS). The transitions between states is examined to determine first if the transition is possible and then to each other to determine an optimal transition. The transition can be optimized in many different ways. In the preferred embodiment it is optimized to the least number of changes of component states. If the optimal transition is null, which means that the VCS is the same as one of the ES, no control actions are required.

To limit the number of states that are searched the next mode of the system is first determined. The next mode is selected based on the current VCS, the function and subsystem (if any), operational requirements and the operator choice of system mode. Each of the component statuses is checked against a list of operational states for that component. The component is considered operable if it can be placed in any normal state by the operator, i.e., run, off or standby. The operability of components is used to determine the operability of the functions and subsystems (if any) of the system. These Functional Operational Indicators are then compared to the Mode Operability Requirements and the Operator's Mode Request to determine the next system mode.

In SES the ES for this mode of system operation are then searched to determine the possible transitions and select the optimal transition. The optimal transition descriptor provides the information necessary to generate the transition procedure. The information consists of a list of the components whose states must change with the current VCS and ES for these components.

The method of the present invention may be understood with reference to FIG. 1 which illustrates a simple system. The system pumps water from a storage tank 10 into a reservoir 18 by pump 12 through first valve 14 and second valve 16. For the system to operate, the pump and at least one valve must be operable; otherwise the system has failed. This system can be considered to have two functions in the operating mode: a pump function which provides a driving pressure head, and a flow path function provided by the valves.

The system is described by the following information:
(1) There are two modes of operation; operating and shutdown.
(2) There are no subsystems.
(3) There are two functions composing the system; the pump function and the flow path function in the operating mode. Note that the shutdown mode has no functional requirement and the system can be simply treated as a series of three components or functions.
(4) There is one component in the pump function and two components in the flow path function.
(5) The pump is a series operation in the pump function and the valves are a parallel operation in the flow path function.
(6) The operating requirements are that the pump and one of the two valves be open (the other closed or failed). The shutdown requirement is that the components be off (closed) or failed.
(7) The number and identity of the component states for operating, non-operating operational or failed are given in

TABLE 1

Component States for Pumping System Example

| Component | Operational States | Operating States | Non-Operating Failed States | States |
|---|---|---|---|---|
| Pump | 00 or 11 | 11 | 0F | 00 or 0F |
| Valve 1 | 00 or 11 | 11 | 0F | 00 or 0F |
| Valve 2 | 00 or 11 | 11 | 0F | 00 or 0F |

The function operational states, for each mode of the system's operation, describe the component operational requirements. This is the number of component configurations that can satisfy the system mode. The component state is designated as operational by a "1" or failed by a "0". The number of functional operational states for each mode is one for a series function since all components must be operational. For a redundant parallel function where 'M' of the 'N' components are required to be operational the number of function operational states is given by: $N!/M!(N-M)!$; where N is the total number of redundant parallel components and M is the number of redundant parallel components required to be operational. For the operating mode of this example the first function is required to be operational; i.e., a "1", the second function has $1+2!(2-1)!=1+2=3$, operational configurations. The first state is both units operational; that is a two of two function which is just a series operation. The system operational states (configurations) by mode are shown in Table 2. For the shutdown mode of operation, the system can be treated as a series of functions, there are two possible states for each function operational or failed. The number of states is then $2^3=8$ functional operation states (or configuration). This is also shown in Table 2.

TABLE 2

Function Operational States

For the Operating Mode:

| Function | Component | State #1 | State #2 | State #3 |
|---|---|---|---|---|
| 1 | Pump | 1 | 1 | 1 |
| 2 | Valve 1 | 1 | 1 | 0 |
|   | Valve 2 | 1 | 0 | 1 |

For the Shutdown Mode:

| Function | Component State | #1 | #2 | #3 | #4 | #5 | #6 | #7 | #8 |
|---|---|---|---|---|---|---|---|---|---|
| 1 | Pump | 0 | 0 | 0 | 0 | 1 | 1 | 1 | 1 |
| 2 | Valve 1 | 0 | 0 | 1 | 1 | 0 | 0 | 1 | 1 |
| 3 | Valve 2 | 0 | 1 | 0 | 1 | 0 | 1 | 0 | 1 |

Next we determine the Established States for each mode of system operation. For the operating mode the first function, the pump function, has one series component. The number of ES is given by $$\prod_{i=1}^{L} I_i,$$

where L is the number of components and $I_i$ is the number of operating states for that component. The number of operating states is obviously equal to one, namely "11".

The number of states for the operating mode for the flow path function is given by $$(N!)\left(\prod_{i=1}^{M} I_i\right)\left(\prod_{i=1}^{N-M} J_i\right) /M!(N-M)!$$

where
N the number of parallel components
M the number of parallel components required to be operating
$I_i$ the number of operating states for the $i^{th}$ of the M component
$J_i$ the number of non-operating states for the i of the N−M component.
The number of operating mode states are then:

$$2!(1)(2)/1!(2-1)!=4$$

These states can be found by inspection to be those shown in Table 3.

TABLE 3

Operating States for Flow Path Function

| Components | Operating State Number | | | |
|---|---|---|---|---|
|  | 1 | 2 | 3 | 4 |
| Valve 1 | 11 | 11 | 00 | 0F |
| Valve 2 | 00 | 0F | 11 | 11 |

The system states are now found by combining the states for each of the two functions. The number of system states given by $$\prod_{i=1}^{P} I_i,$$

where P is the number of series function in the system and $I_i$ is the number of operating states for the $i^{th}$ function. The number of system states for the operating mode of this example is then, $I_i=1.4=4$. Again these can be found by inspection and are given in Table 4.

TABLE 4

Operating Mode Established States for Pumping System Example

| Component | System State Number | | | |
|---|---|---|---|---|
| | 1 | 2 | 3 | 4 |
| Pump | 11 | 11 | 11 | 11 |
| Valve 1 | 11 | 11 | 00 | 0F |
| Valve 2 | 00 | 0F | 11 | 11 |

As noted in our description of the system there are not functional requirements for the shutdown mode. In this case the system states are found by freely combining the component states as if the system was a series function. The number of system states is, therefore, found using the formula $$\prod_{i=1}^{L} J_i,$$

where L is the number of system components and $J_i$ is the number of non-operating states for the $i^{th}$ system component. There are then, $$\prod_{i=1}^{3} J_i = 2 \cdot 2 \cdot 2 = 8,$$

shutdown mode system states and these are shown in Table 5.

TABLE 5

Shutdown Mode Established States for Pumping System Example

| Component | System State Number | | | | | | | |
|---|---|---|---|---|---|---|---|---|
| | 5 | 6 | 7 | 8 | 9 | 10 | 11 | 12 |
| Pump | 00 | 00 | 00 | 00 | 0F | 0F | 0F | 0F |
| Valve 1 | 00 | 00 | 0F | 0F | 00 | 00 | 0F | 0F |
| Valve 2 | 00 | 0F | 00 | 0F | 00 | 0F | 00 | 0F |

Figure 2:
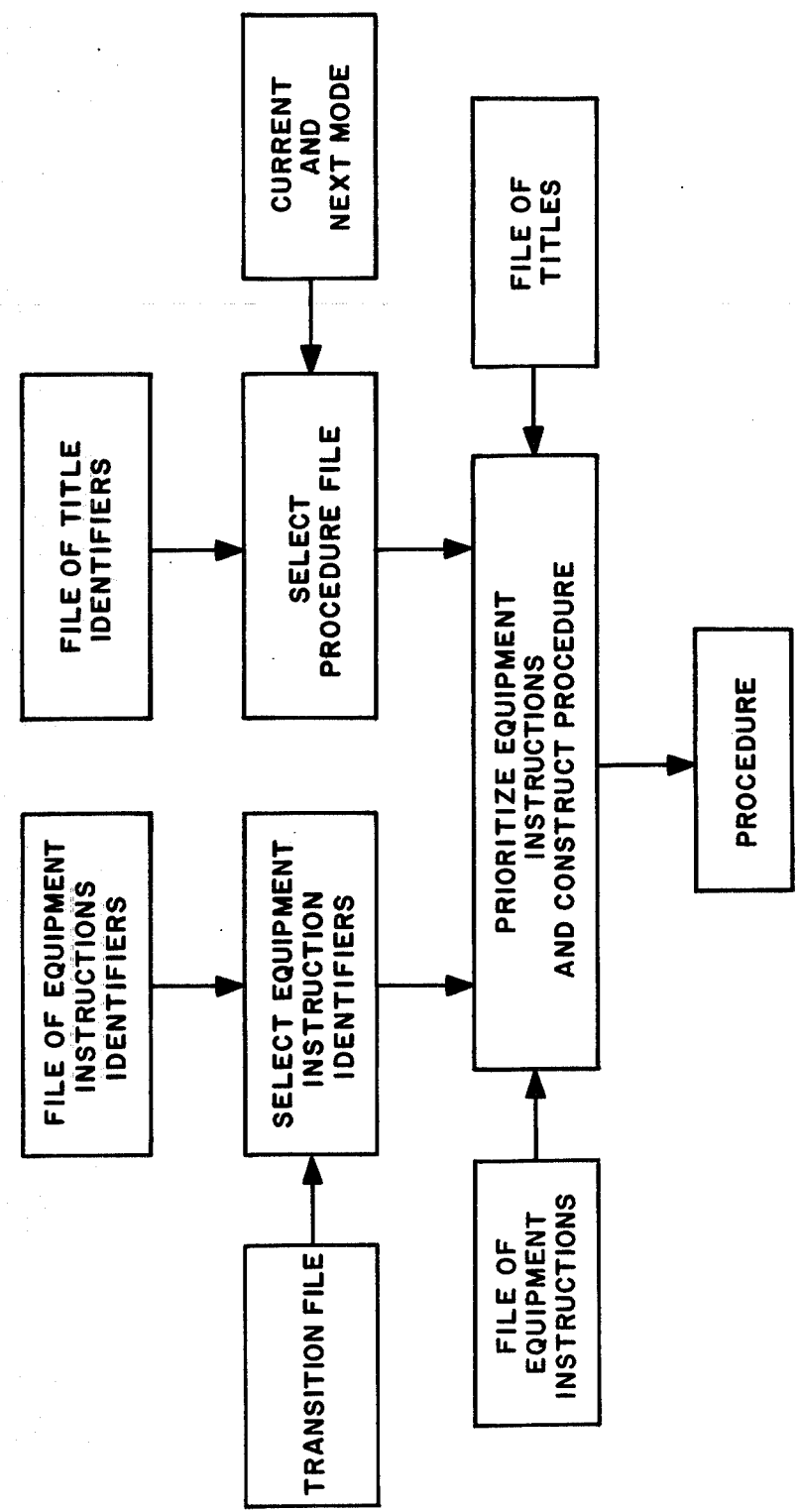
FIG. 2 is a generalized logic flow diagram of the method of the invention.

All the information has now been explicity defined so that the SES function shown in FIG. 2 can be walked through to determine the Optimal Transition Descriptor given the input of a Validated Component Status (VCS).

Remember that the VCS was defined to be the verified operational status of each component in the system. For the purpose of this example let us assume the system conditions to be as follows: all the components are operational and in their 'Off' (00) status, and the system mode is shutdown. The operator now places an Operator Mode Request that the system be operating. The functions in FIG. 2 will now be discussed in order. Note a shorthand will be used to write the states; $S = (P, V_1 V_2)$, where P is the status of the pump and $V_1$, $V_2$ are the statuses of the valves 1 and 2 respectively.

The VCS is first compared to the file of Component Operational States; Table 1 shows the operational states. The VCS = (00,00,00), it is observed that each of the component statuses are found in Table 1, in the column titles Operational States. The output from function number 1 is the Component Operational Indicator. This indicates each of the components in this case is operational, i.e., they are "1". The Component Operational Indicator (COI) is, therefore, (1,1,1).

The next function, Determine Function Operational Status, compares the COI to the file of Function Operational States given in Table 2 to determine if there is an exact match. The states can be written in the shorthand notation as (1,1,1), (1,1,0), and (1,0,1). The comparison can be done as follows:

The elements of each of these states can be added using a Module 2 operator; that is (0).(0). = 0,
(0).(1). = 1,
(1).(0). = 1,
(1).(1). = 0.

So that if the COI (1,1,1) is added to the first Function Operational State (1,1,1) the resultant is (0,0,0). If the resultant, the Function Operational Indicator, is (0,0,0) then an exact match for the VCS has been found in the Functional Operation States file. Since in this example there was an exact match, the function performed in the Select Next Mode function II.3 determines if the operator mode request can be met given the current system states. If it cannot, the functions logic determines the next mode the system can be in based on an input hierarchy of preferred modes of operation.

In the last function the ES file for the operating mode is compared to the VCS element by element using the operators discussed in the Component Representation section. The operating mode's ES were presented in Table 4. Using the operators set forth in the Component Representation section we operate on the VCS with each of the ES: i.e.,

| VCS | ES#1 | | |
|---|---|---|---|
| 00 | 11 | | 1 |
| 00 | 11 | = | 1 |
| 00 | 00 | | 0 |
| VCS | ES#2 | | |
| 00 | 11 | | 1 |
| 00 | 11 | = | 1 |
| 00 | 0F | | N |
| VCS | ES#3 | | |
| 00 | 11 | | 1 |
| 00 | 00 | = | 0 |
| 00 | 11 | | 1 |
| VCS | ES#4 | | |
| 00 | 11 | | 1 |
| 00 | 0F | = | N |
| 00 | 11 | | 1 |

Since ES numbers 2 and 4 produce transition vectors which contain an "N", these transitions are not possible since there are no control actions to fail a component. The other two ES numbers, 1 and 3, have an equivalent number of component changes (i.e., "1"'s in the transition vector) that must occur to go from the shutdown mode to the operating mode in this example. The closest or optimum transition in this example, is the transition to the ES with the minimum number of component changes. In a case of a tie as observed here, the first state with the minimum number is chosen. The instruction generation rules discussed in the next section show that the required instructions are to start-up the pump and (open) the valve.

As another example, assume the system is now operating in ES number 1, (11,11,00). It is detected that valve number 1 has failed, that is its state is '0F'. The VCS would then be (11,0F,00). Stepping through the functions, II.1 through II.3 the next mode would still be 'operating'. Now adding the VCS to the operating ES we find:

| 11 | 11 | 0 | | 11 | 11 | 0 | | 11 | 11 | 0 | | 11 | 11 | 0 |
|---|---|---|---|---|---|---|---|---|---|---|---|---|---|---|
| 0F | 11 | = N, | | 0F | 11 | = N, | | 0F | 00 | = N, | | 0F | 0F | = 0 |

-continued

| 00 | 00 | 0 | 00 | 0F | N | 00 | 11 | 1 | 00 | 11 | 1 |

The first three ES produce transition vectors which contain "N's", indicating the transition is not possible. The last ES produces a transition vector with only one "1". The optimal transition descriptor then consists of a list of all components that require a change (those that have a "1" in the transition vector), the previous state, in this case (00), and the final state (11). The instruction generation rules then discussed in the next section show that the required instruction is a start-up instruction for Valve 2.

The method of the present invention applies to systems which have stable operating modes recognizable by the process state. It is easiest to apply to systems whose components exhibit an absolute behavior of either operating as specified or failed completely (e.g., switches, relays, motors). It it more difficult to analyze systems whose components can exhibit varying degrees of performance (e.g., valves, pipes, pressurizers, etc.) or partial failure modes. These can induce different process states depending on the extent of operation for failure. The status of equipment as represented by the VCS is easiest to handle when binary; operable or failed.

Given a status of the system's equipment, it is then possible to determine if an acceptable state can be achieved in any of the modes of system operation. The rules by which this decision is reached can be changed depending on the operating mode of the system. For example, during the power operation mode of a reactor, components in the system are not allowed to be repaired. When in the shutdown mode, however, equipment can be repaired but not placed in the operating state.

Turning now to FIG. 2, a generalized logic flow diagram of the invention is shown.

The first function performed is that of selecting the procedure title 34. The procedure title provides to the operator overview points of reference. The information presented in the title indicate for which systems the component instructions apply. The title also indicates if a change of the system's mode of operation is required. If a change is required the previous mode is indicated along with a possible next mode for the system. If no change of mode is required it indicates the current system mode.

The component instructions are selected from instruction file 26. For a given transition the optimal transition file consisting of a list of components whose state must change, their current VCS and the ES to which the component state is to be changed.

One possible set of rules for the selection of component instructions is shown in Table 6. The selection is based on the components VCS and ES elements. For the VCS element shown in column 1 and ES shown in column 2, the instruction format type is shown in column 3. Notice that not all ES are listed in column 2. The reason for the absence of certain ES is because the transition is not possible or the ES is not an acceptable component state.

TABLE 6

| Component Instruction Selection Rules | | |
|---|---|---|
| VCS | ES | Instruction Type |
| 11 | 00 | Shutdown |

TABLE 6-continued

| Component Instruction Selection Rules | | |
|---|---|---|
| VCS | ES | Instruction Type |
| 11 | M0 | Shutdown and infrequent |
| 1F | MF | Infrequent |
| 00 | 11 | Startup |
| 0F | MF | Infrequent |
| S0 | 11 | Startup |
| S0 | 00 | Shutdown |
| S1 | 11 | Startup |
| S1 | 00 | Shutdown |
| SF | MF | Infrequent |
| M0 | 11 | Maintenance and startup |
| M0 | 00 | Maintenance |
| MF | M0 | Repair |

Transitions which are not possible are those which start in an operable state and go to a failed state or those which start in a failed state and go to an operable state. The only exception is MF M0 which provides a repair procedure for the component. States which are not acceptable ES are (S1), (0F), (SF) (1F). They are not acceptable because failed units should have their control switches placed in the 'OFF' position and be isolated from the system using a maintenance instruction.

There are five instruction types listed in Table 6. These are generic instructions which provide the following type of direction to the operator.

- o startup—instructs the operator to perform the startup control actions required to place the component in the operating state.
- o shutdown—instructs the operator to perform the shutdown control actions required to place the component in the non-operating operational state.
- o infrequent—instructs the operator to perform the maintenance control actions necessary to isolate a component from the system.
- o maintenance—instructs the operator to perform the maintenance control actions required to place the component in the operational state.
- o repair—instructs the operator how to perform the required repair of a failed component.

The component instructions are then presented to the operator in predetermined ordered arrangement. For example one such ordering of instructions would be maintenance, startup, shutdown, infrequent and repair. Within each instruction type the instructions for components can be ordered so that system functions are controlled in a particular order for startup, shutdown, maintenance, infrequent and repair operations.

Figure 3:
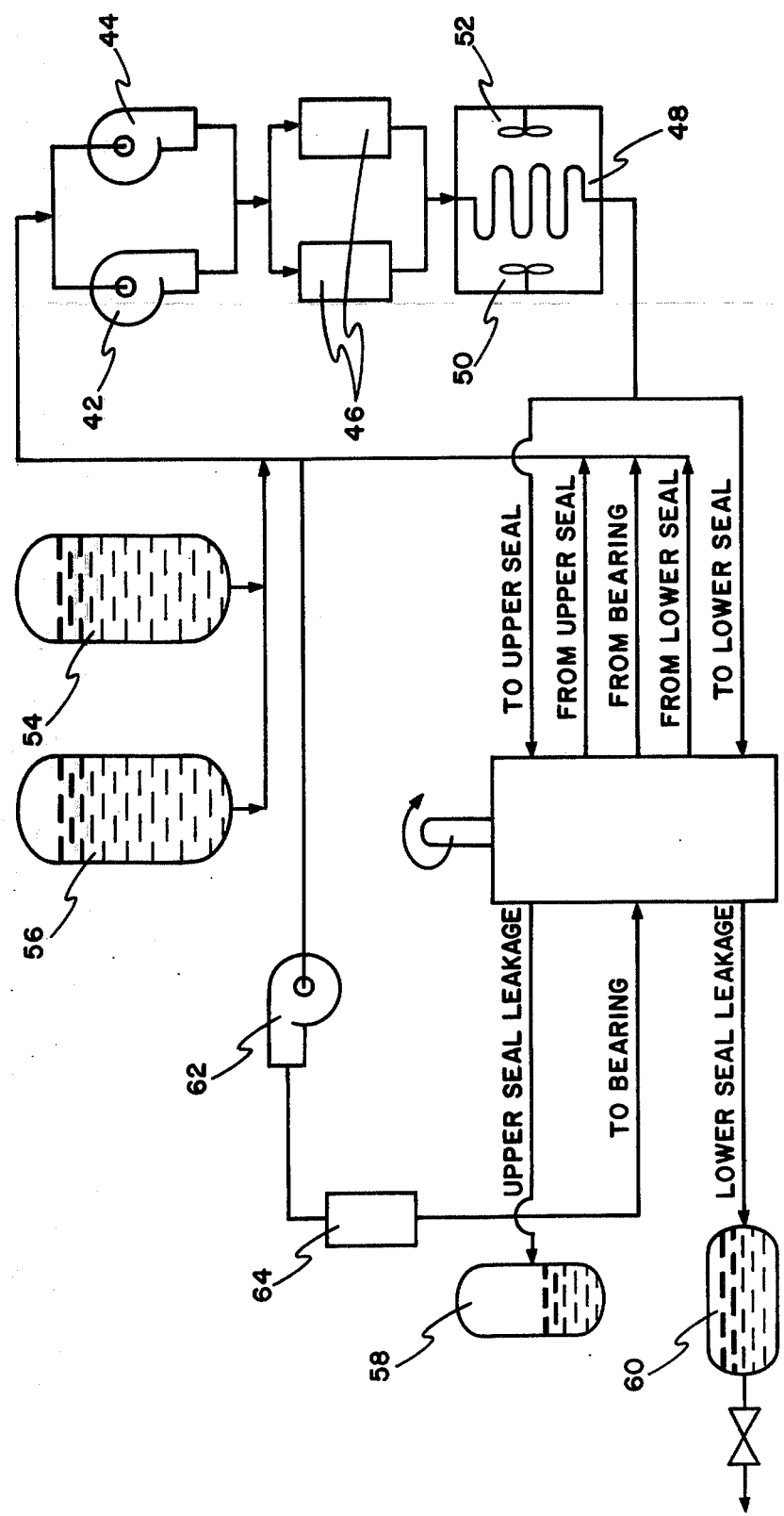
FIG. 3 is a flow diagram of a typical lubrication circulation system employed in a liquid metal cooled fast breeder reactor.

The present invention may be best understood in relation to an exemplary embodiment, a lubrication circulation system used with a main heat transfer pump in a liquid metal cooled reactor and illustrated in FIG. 3. The heat transfer system pump 40 itself is used to circulate the reactor's coolant and to carry heat away from the reactor's core. As such, the pumps reliable operation is essential to the safe operation of the reactor. During pump operation, lubricant must be supplied to an upper and lower seal and a bearing and any lubricant which leaks past the seals must be reclaimed. Lubricant is supplied by either oil pump No. 1 (42) or oil pump No. 2 (44) through filter 46. The oil is cooled in cooler 48 by Fan No. 1 (50) and Fan No. 2 (52) before flowing to the upper and lower seals of HTS pump 40. When the system is operating properly the inlet pressure of the oil circulation pumps 42 and 44 should be $5\frac{1}{2}$ psig, the discharge should be 45–50 psig; have a temperature between 110° F.–145° F.; and a flow rate of 20 gpm. During startup, oil at 4 gpm and 1000 psig is supplied to the bearing for 10 seconds by oil lift pump 62 through a filter 64. Return oil flow is conducted through upper and lower seal return lines and bearing return line. Oil leaking from the upper and lower seal is collected in the upper and lower seal leakage reservoirs 58 and 60. Makeup oil is supplied from main oil reservoir 54 and fill oil reservoir 56. It is important to maintain a strict inventory of oil supplied from the fill tanks and that collected in the leakage tanks, since any difference would probably be leaking into the sodium coolant of the reactor.

The following alarm/indication lights are on the Oil System Control panels;

A. Supply Reservoir Low Level—Reservoir oil level down to 2 or less gallons.

B. Circulation Filter High Differential Pressure—Filter differential pressure is 25 psig or more.

C. Circulation Supply High Temperature—Temperature switch senses lube oil greater than 125° F.

D. Upper Seal Leakage Tank High Level—More than 9¼ gallons of oil in tank sensed by float switch.

E. Lower Seal Leakage Reservoir High Level—Lower seal leakage tank is full as sensed by a floating switch.

F. Lower Seal Leakage Reservoir Low Level—Lower seal leakage tank is empty or nearly empty as sensed by liquid level transmitter. If lower seal leakage pump is on it should be stopped. Normally the pump stops automatically or cannot be started if this alarm is illuminated.

G. Lower Seal Leakage Reservoir Emergency Level—Reservoir is full as sensed by fluid level transmitter. This serves as a safety warning in the event the high level alarm does not operate.

H. Circulation Pump Low Differential Pressure—Pressure switch senses less than 40 psig. This is caused by both circulation pumps being off, valves closed or partially closed, or system pressure drop unusually low. Standby circulation pump should start automatically and extinguish light.

I. Seal/Baring Low Differential Pressure—Pressure switch sense less than 10 psig. This could be caused by lack of oil flow through seal/bearing housing.

J. Circulation Pump No. 1 Relief—Oil flow through relief valve sensed by flow switch.

K. Circulation Pump No. 2 Relief—Oil flow through relief valve sensed by flow switch.

L. Oil Lift Pump Relief—Oil flow through relief valve sensed by flow switch.

M. Upper Seal Return High Temperature—Temperature switch sensed by flow switch.

N. Lower Seal Return High Temperature—Temperature switch senses lube oil over 155° F.

O. Lower Seal Leakage Pump Relief—Oil flow through relief valve sensed by flow switch. This is a false indication if Lower Seal Leakage Pump is not running. Otherwise, solenoid valve may be stuck closed.

P. Oil Lift Return High Temperature—Temperature switch senses lube oil over 155° F.

Q. Seal/Bearing Relief—Oil flow through relief valve sensed by flow switch. Indicates seal/bearing pressure is more than 75 psig above reservoir pressure.

R. Oil Life Filter High Differential Pressure—Filter element is dirty.

S. Circulation Pump No. 1 Fail—Automatic transfer from Pump No. 1 to Pump No. 2 caused by loss of power motor overload, or low pump differential pressure.

T. Circulation Pump No. 2 Fail—Automatic transfer from Pump No. 2 to Pump No. 1 caused by loss of power motor overload, or low pump differential pressure. Determined cause of automatic transfer from Pump No. 2 to Pump No. 1.

U. Fan No. 1 Fail—Airflow not detected by air switch. Fan No. 1 starts automatically. Caused by fan motor overload or air shutters fail to open.

Figure 4:
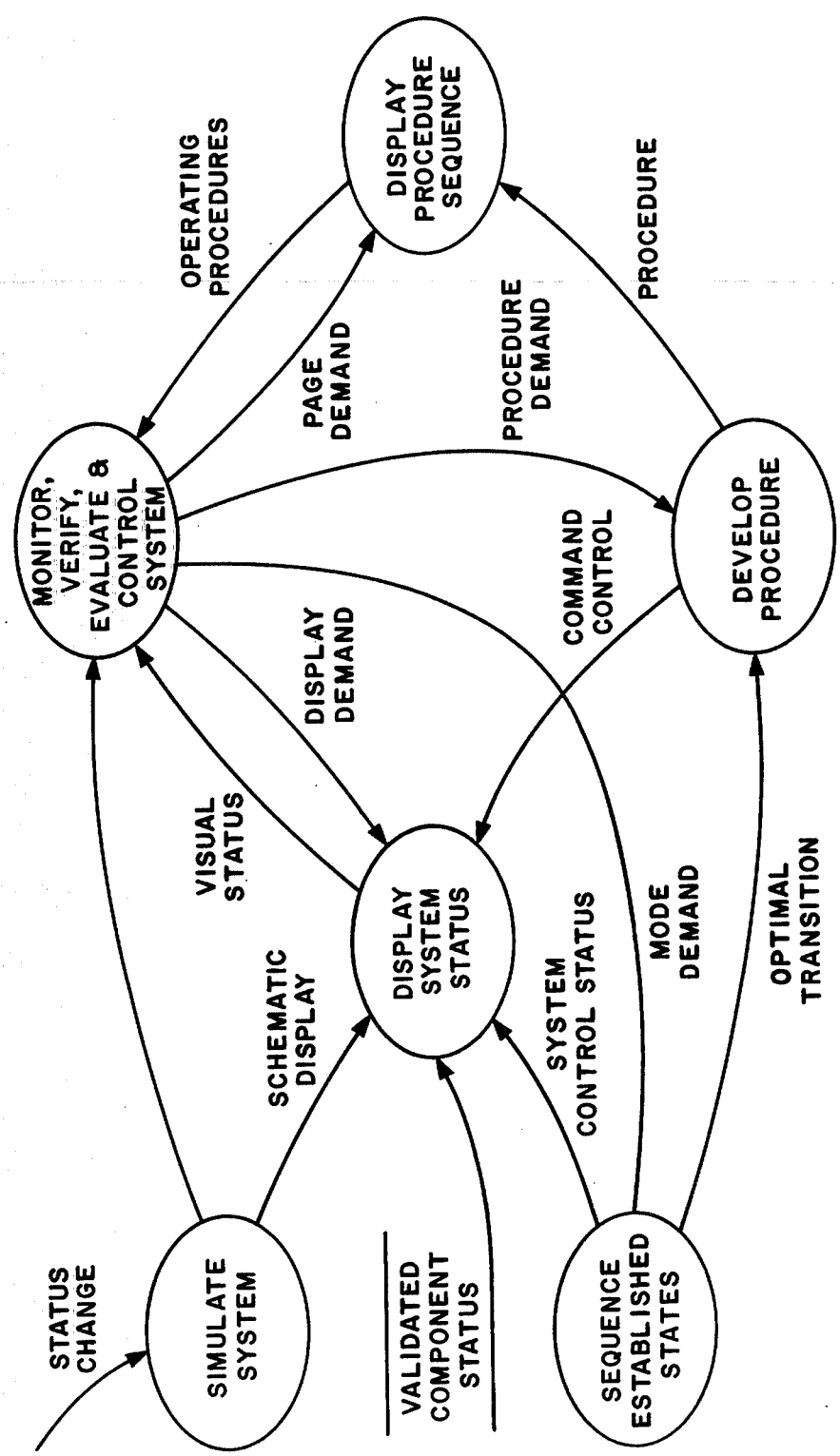
FIG. 4 is a logic flow diagram which illustrates the interrelationships between the routines of the exemplary computer program.

The exemplary system has the following program parts:

Driver Program
GETSORT Routine
Simulation System Routine
Sequence Established States Routine
Develop Procedure Routine
Display System Status Routine
Display Procedure Sequence Routine The relationship between the last five programs is shown in FIG. 4.

Brief description of all the programs follows:

Driver Program—The Driver Program is the controller for the rest of the Procedure Prompting System. It chooses the correct routines to execute according to the information passed from the GETSORT routine.

GETSORT Routine—GETSORT senses data input, i.e. failures and input commands, from the RAMTEK keyboard, sorts the data and puts it into the appropriate files to be used by the Driver Program.

Simulation Routine—The simulation routine translates keyboard commands to visual component status displays on the RAMTEK 9400 while representing all the component functions, states and interrelationships.

Sequencing Established States (SES)—The SES routine searches the established system equipment states and selects the optimal transition to the next system state. The optimal change in this program is the one which requires the least number of component control actions.

Develop Procedure—The Develop Procedure routine takes the optimal transition, the previous validated component status, the established state element, the previous and next mode, and generates a procedure based on an equipment operating hierarchy.

Display System Status—The Display System Status routine displays to the operator on the RAMTEK screen the current status of all equipment, the system state, alarm and error messages.

Display Procedure Sequence—The Display Procedure Sequence routine displays to the operator the procedure whch consists of the title and component instructions. The title gives an overview of the system mode or mode transition and a summary of component changes. The component instructions provide detailed component operating instructions.

Figure 5:
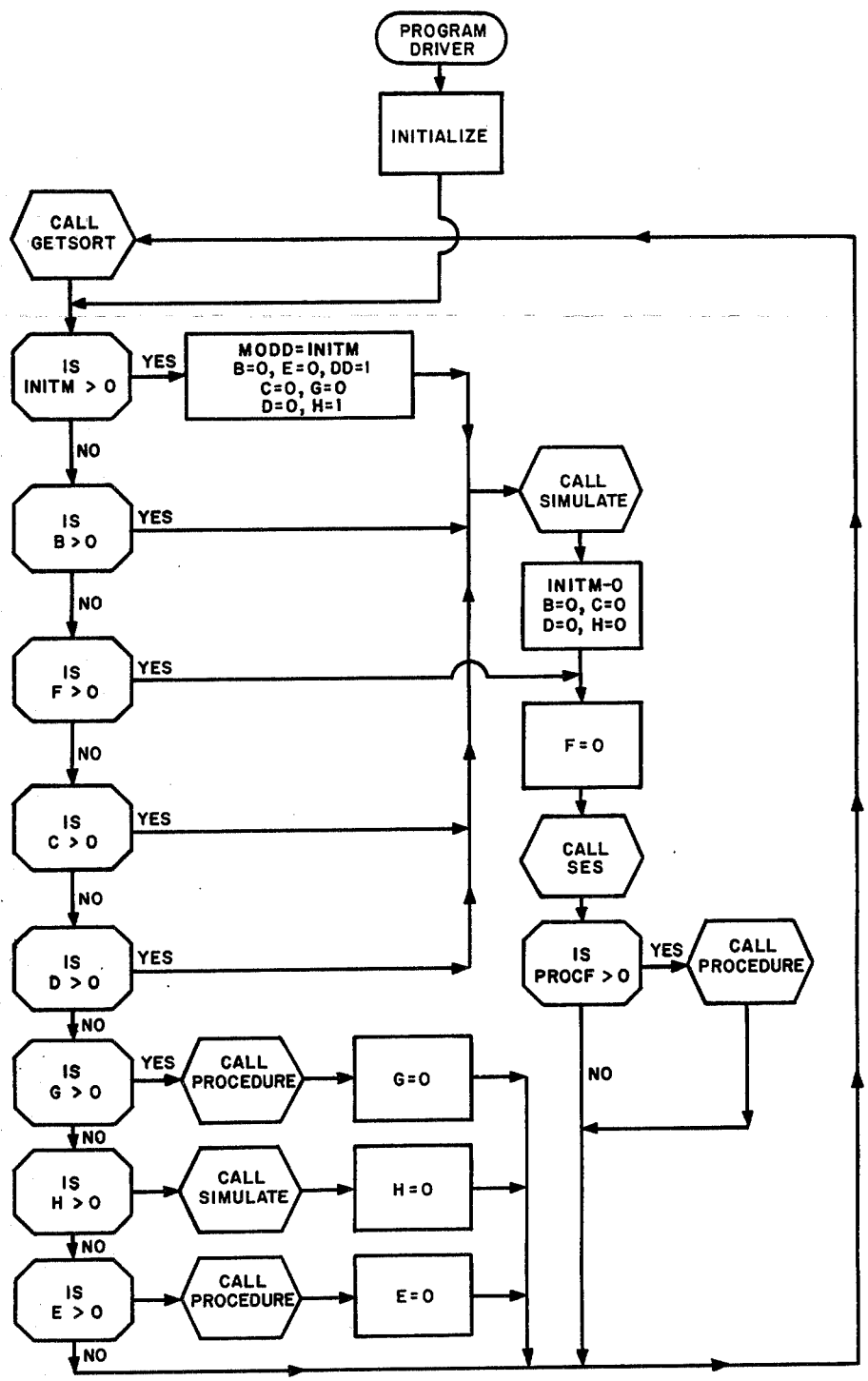
FIG. 5 is a program flow chart for the driver program of the exemplary computer program.
Figure 6:
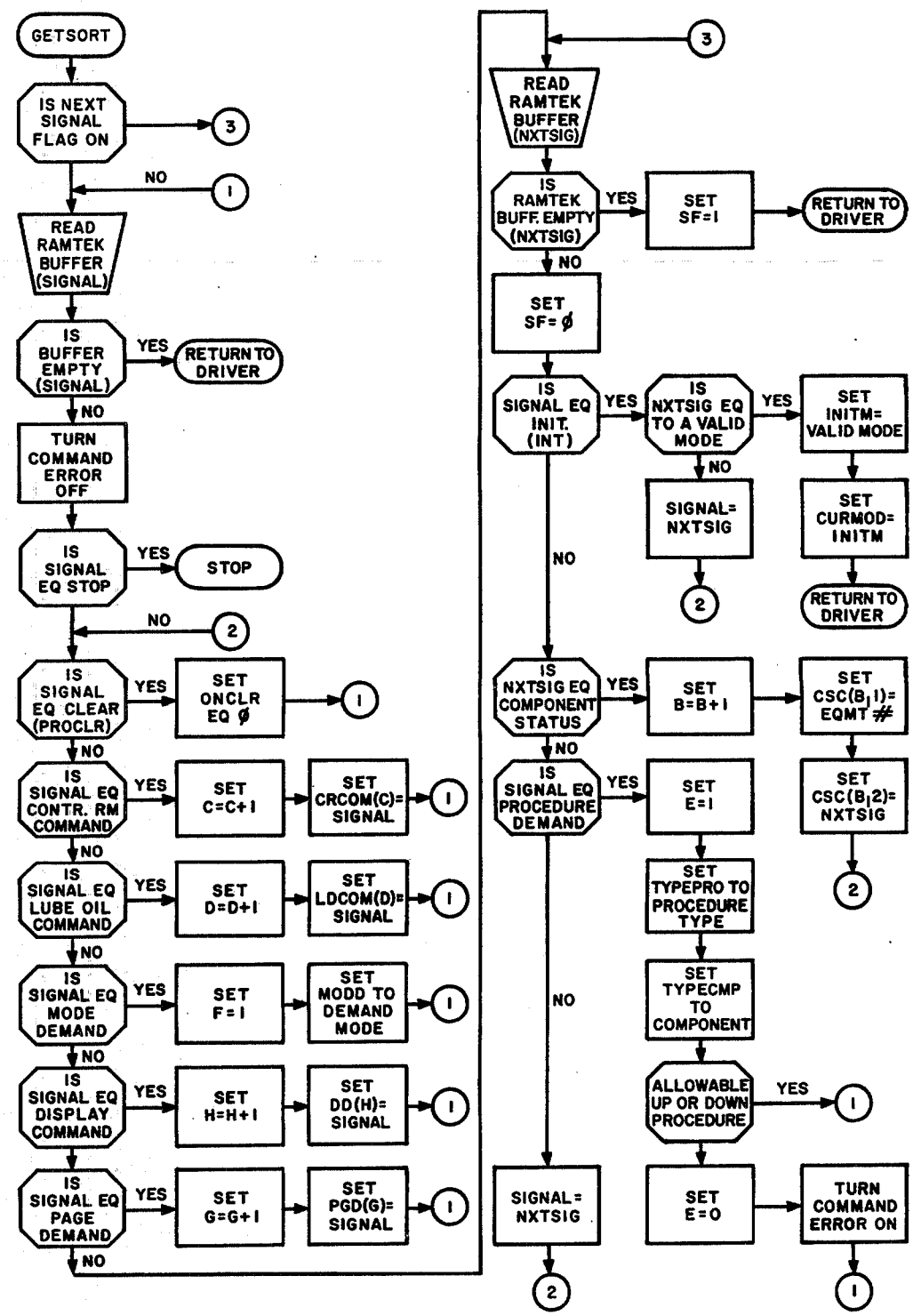
FIG. 6 is a program flow chart for the GETSORT routine of the exemplary computer program.

FIGS. 5 and 6 show the Program Flow Charts for the Driver Program and the GETSORT routine. The programs are listed as follows:

PROGRAM LISTING

```
      PROGRAM DRIVER
C*****************************************************************
C** PROGRAM DRIVER READS DATA FILES AND CALLS THE
C**   APPROPRIATE SUBROUTINES TO DO THE WORK NEEDED
C*****************************************************************
      IMPLICIT INTEGER*2 (A-Z)
      INCLUDE 'COMVAR.COM'
      INCLUDE 'KEYBSET.FOR'
      CALL ASSIGN
      CALL LOSCOLOR
      CALL RSET(IERR)
C
C** Initialize variables
C
      INITM=SSU
      CURMOD=INITM
      SF=0
      TC=0
      ONCLR=0
      BB=0
      FIRST_TIME = .TRUE.
      CALL CLR
      CALL TOP_SEG
      GDCK=TOP
      GO TO 200
C*****************************************************************
100   CALL GETSORT
      if(TC.GT.0.AND.ONCLR.EQ.1) ONCLR=0
      if (TC.EQ.0.AND.ONCLR.EQ.0) CALL CLR
C*
200   IF(INITM.GT.0) THEN
C** SET VARIABLES
         MODD-INITM
         B=0
         C=0
         D=0
         G=0
         H=1
         DD(1)=1
      GO TO 300
      ENDIF
C
C*  Check for component status change
C
      IF(B.GT.0) THEN
         GO TO 300
      ENDIF
C
C*  Check for mode demand command
C
      IF(F.GT.0) THEN
         GO TO 400
      ENDIF
```

```
C
C* Check for control room commands
C
      IF(C.GT.0) THEN
        GO TO 300
      ENDIF
C
C* Check for lube oil commands
C
      IF(D.GT.0) THEN
        GO TO 300
      ENDIF
      GO TO 500
C**
300   CALL SIMULATE
C**
C* SET VARIABLES
      INITM=0
      B=0
      C=0
      D=0
      H=0
C**
400   F=0
C**
      CALL SES
C**
      IF(PROCF.GT.0) THEN
C** SET VACIABLES
C**
        CALL PROCEDURE
      ENDIF
      GO TO 100
C**
C
C* Check for page commands
C
500   IF(G.GT.0) THEN
C** SET VARIABLES
C**
        CALL PROCEDURE
C** SET VARIABLE
        G=0
      ENDIF
C
C* Check for display commands
C
      IF(H.GT.0) THEN
        CALL SIMULATE
C** SET VARIABLE
        H=0
      ENDIF
      IF(E.EQ.1) THEN
        ONCLR=1
        CALL PROCEDURE
        E=0
```

```
      ENDIF
      GO TO 100
      END

SUBROUTINE GETSORT
C*****************************************************************
C** THIS ROUTINE READS THE RAMTEK KEYBOARD AND DECIDES
C** WHAT TYPE OF DATA IT IS AND STORES IT IN THE
C**APPROPRATE FILE.
C*****************************************************************
C
      IMPLICIT INTEGER*2 (A-Z)
      INCLUDE 'COMVAR.COM'
      INCLUDE 'KEYBSET.FOR'
      OUT = 9
      CALL SLFS(.TRUE.,.FALSE.,0,IERR)
      CALL SKES(.TRUE.,.FALSE.,0,0,255,0,0,IERR)
C
C** THIS RKB READS SIGNAL INPUT FROM RAMTEK
C
100   CALL COP(1270,1020,IERR)
      CALL FGD(0,IERR)
      CALL BGD(0,IERR)
      CALL RKB(0,SIGNAL, NODATA, OVRFLW, ERRFLG, IERR)
C
C*
C
      IF(SIGNAL.EQ.0) RETURN
      CALL OFFCMDERR
      IF(SIGNAL.EQ.STOP) THEN
      CALL DEASSIGN
      STOP
      END IF
200   CONTINUE
      WRITE(OUT,10) SIGNAL
10    FORMAT(' SIGNAL = ',I4)
C
C** Check for signal key type **
C
C*    Check for clear demand procedure
C
      IF(SIGNAL.EQ.PROCLR) THEN
       ONCLR=0
       GO TO 100
      ENDIF
C
C*    Check for control room commands
C
      IF(SIGNAL.EQ.RSTART.OR.SIGNAL.EQ.RSTOP.OR.SIGNAL.EQ.MSTART
     .OR.SIGNAL.EQ.MSTOP.OR.SIGNAL.EQ.PSTART.OR.SIGNAL.EQ.
     PSTOP) THEN
C*    Set variable C
          C=C+1
```

```
C*    Load file
            CRCOM(C)=SIGNAL
            GO TO 100
          ENDIF
C
C*    Check for lube oil commands
C
          IF(SIGNAL.EQ.R1ON.OR.SIGNAL.EQ.R1R3OFF.OR.SIGNAL.EQ.R3ON
         +  .OR.SIGNAL.EQ.C1ON.OR.SIGNAL.EQ.C1C2PFF.OR.SIGNAL.EQ.C2ON
         +  .OR.SIGNAL.EQ.L1START.OR.SIGNAL.EQ.L1STOP.OR.SIGNAL.EQ.L2START
         +  .OR.SIGNAL.EQ.L2STOP.OR.SIGNAL.EQ.I1START.OR.SIGNAL.EQ.I1STOP
         +  .OR.SIGNAL.EQ.I1OPEN.OR.SIGNAL.EQ.I3CLOSED.OR.SIGNAL.EQ.R5IN
         +  .OR.SIGNAL.EQ.R6IN) THEN
C
C*    Set variable D
C
            D=D+1
C
C*    Load files
C
            LOCOM(D)=SIGNAL
            GO TO 100
          ENDIF
C
C*    Check for mode demand
C         IF(SIGNAL.EQ.SU.OR.SIGNAL.EQ.MM.OR.SIGNAL.EQ.LP.OR.SIGNAL
         +  .EQ.SD) THEN
C
C*    Set variable H
C
            H=H+1
C
C*    Load file
C
            DD(H)=SIGNAL
            GO TO 100
          ENDIF
C
C*    Check for page demands
C
          IF(SIGNAL.EQ.PGTOP.OR.SIGNAL.EQ.PGFORWARD.OR.SIGNAL.EQ.PGBACK)
         +  THEN
C
C*    Set variable G
C
            G=G+1
C
C*    Load file
C
            PGD(G)=SIGNAL
            GO TO 100
          ENDIF
```

```
C
C** Check for initialization or component ID
C
        IF(SIGNAL.EQ.INT.OR.SIGNAL.EQ.EQPMTI1.OR.SIGNAL.EQ.EQPMTI2.OR
      + SIGNAL.EQ.EQPMTI3.OR.SIGNAL.EQ.EQPMTI4.OR.SIGNAL.EQ.EQPMTI5
      + .OR.SIGNAL.EQ.EQPMTL1.OR.SIGNAL.EQ.EQPMTL2.OR.SIGNAL.EQ.EQPMTL2
      + .OR.SIGNAL.EQ.EQPMTL3.OR.SIGNAL.EQ.EQPMTL4.OR.SIGNAL.EQ.EQPMTC1
      + .OR.SIGNAL.EQ.EQPMTC2.OR.SIGNAL.EQ.EQPMTR1.OR.SIGNAL.EQ.EQPMTR2
      + .OR.SIGNAL.EQ.EQPMTR3.OR.SIGNAL.EQ.EQPMTR4.OR.SIGNAL.EQ.EQPMTR5
      + .OR.SIGNAL.EQ.EQPMTR6.OR.SIGNAL.EQ.EQPMTR7) THEN
          GO TO 300
        ENDIF
C
C*    This RKB reads data for nxtsig
C
300     CALL RKB(0,NXTSIG,NODATA,OVRFLW,ERRFLG,IERR)
        IF(NXTSIG.EQ.0) THEN
C
C*    Set variable SF to 1
C
          SF-1
          RETURN
        ENDIF
        WRITE(OUT,30) NXTSIG
30      FORMAT(' NXTSIG = ',14)
C
C*    Set variavle SF to 0
C
        SF=0
C
C*    Is signal initialization
C
        IF(SIGNAL.EQ.INT) THEN
          IF(NXTSIG.EQ.SU.OR.NXTSIG.EQ.MM.OR.NXTSIG.EQ.LP.OR.NXTSIG.EQ.SD)
      +     THEN
C
C*    Load file
C
            IF(NXTSIG.EQ.SU) INITM=SSU
            IF(NXTSIG.EQ.MM) INITM=SMM
            IF(NXTSIG.EQ.LP) INITM=SLP
            IF(NXTSIG.EQ.SD) INITM=SSD
            CURMOD=INITM
            RETURN
          ELSE
            SIGNAL=NXTSIG
            GO TO 200
          ENDIF
        ENDIF
```

```
C
C*   Is NXTSIG component status
C
      IF(NXTSIG.EQ.ONE_ZERO.OR.NXTSIG.EQ.ONE_ONE.OR.NXTSIG.EQ.ZERO_ONE
     +  .OR.NXTSIG.EQ.ZERO_ZERO.OR.NXTSIG.EQ.S_ONE.OR.NXTSIG.EQ.S_ZERO
     +  .OR.NXTSIG.EQ.S_F.OR.NXTSIG.EQ.ONE_F.OR.NXTSIG.EQ.ZERO_F
     +  .OR.NXTSIG.EQ.P_ONE.OR.NXTSIG.EQ.P_ZERO.OR.NXTSIG.EQ.F_ONE
     +  .OR.NXTSIG.EQ.F_ZERO.OR.NXTSIG.EQ.M_F.OR.NXTSIG.EQ.M_ZERO)THEN
C
C*   Set variable B
C
         B=B+1
C
C*   Set component ID accordign to SIGNAL
C
         IF(SIGNAL.EQ.EQPMTL1) CSC(B,1)=1
         IF(SIGNAL.EQ.EQPMTL2) CSC(B,1)=2
         IF(SIGNAL.EQ.EQPMTL3) CSC(B,1)=3
         IF(SIGNAL.EQ.EQPMTL4) CSC(B,1)=4
         IF(SIGNAL.EQ.EQPMTC1) CSC(B,1)=5
         IF(SIGNAL.EQ.EQPMTC2) CSC(B,1)=6
         IF(SIGNAL.EQ.EQPMTR1) CSC(B,1)=7
         IF(SIGNAL.EQ.EQPMTR2) CSC(B,1)=8
         IF(SIGNAL.EQ.EQPMTR3) CSC(B,1)=9
         IF(SIGNAL.EQ.EQPMTR4) CSC(B,1)=10
         IF(SIGNAL.EQ.EQPMTR5) CSC(B,1)=11
         IF(SIGNAL.EQ.EQPMTR6) CSC(B,1)=12
         IF(SIGNAL.EQ.EQPMTR7) CSC(B,1)=13
         IF(SIGNAL.EQ.EQPMTI1) CSC(B,1)=14
         IF(SIGNAL.EQ.EQPMTI2) CSC(B,1)=15
         IF(SIGNAL.EQ.EQPMTI3) CSC(B,1)=16
         IF(SIGNAL.EQ.EQPMTI4) CSC(B,1)=17
         IF(SIGNAL.EQ.EQPMTI5) CSC(B,1)=18
         WRITE(OUT,50) CSC(B,1)
50       FORMAT(' CSC(B,1) = ',I4)
C
C*   Set component status change to NXTSIG
C
         CSC(B,2)=NXTSIG
         WRITE(OUT,55) CSC(B,2)
55       FORMAT(' CSC(B,2) = ',I4)
         GO TO 100
         ENDIF
C
C*   Check for demand procedure
C
      IF(SIGNAL.EQ.UPPRO.OR.SIGNAL.EQ.DNPRO.OR.
     +    SIGNAL.EQ.INPRO.OR.SIGNAL.EQ.RPPRO.OR.
     +    SIGNAL.EQ.MTPRO) THEN
C
C    Set procedure tye
```

```
      E=1
      IF(SIGNAL.EQ.MTPRO) TYPEPRO=1 ! MPRO
      IF(SIGNAL.EQ.UPPRO) TYPEPRO=2 ! UPRO
      IF(SIGNAL.EQ.DNPRO) TYPEPRO=3 ! DPRO
      IF(SIGNAL.EQ.INPRO) TYPEPRO=4 ! IPRO
      IF(SIGNAL.EQ.RPPRO) TYPEPRO=5 ! RPRO

Set equipment

IF(NXTSIG.EQ.EQPMTL1) TYPECMP=L1
      IF(NXTSIG.EQ.EQPMTL2) TYPECMP=L2
      IF(SIGNAL.EQ.EQPMTL3) TYPECMP=L3
      IF(SIGNAL.EQ.EQPMTL4) TYPECMP=L4
      IF(SIGNAL.EQ.EQPMTC1) TYPECMP=C1
      IF(SIGNAL.EQ.EQPMTC2) TYPECMP=C2
      IF(SIGNAL.EQ.EQPMTR1) TYPECMP=R1
      IF(SIGNAL.EQ.EQPMTR2) TYPECMP=R2
      IF(SIGNAL.EQ.EQPMTR3) TYPECMP=R3
      IF(SIGNAL.EQ.EQPMTR4) TYPECMP=R4
      IF(SIGNAL.EQ.EQPMTR5) TYPECMP=R5
      IF(SIGNAL.EQ.EQPMTR6) TYPECMP=R6
      IF(SIGNAL.EQ.EQPMTR7) TYPECMP=R7
      IF(SIGNAL.EQ.EQPMTI1) TYPECMP=I1
      IF(SIGNAL.EQ.EQPMTI2) TYPECMP=I2
      IF(SIGNAL.EQ.EQPMTI3) TYPECMP=I3
      IF(SIGNAL.EQ.EQPMTI4) TYPECMP=I4
      IF(SIGNAL.EQ.EQPMTI5) TYPECMP=I5

*  Check for allowable UP or DOWN procedure

IF(TYPEPRO.EQ.2.OR.TYPEPRO.EQ.3) THEN
       IF(TYPECMP.EQ.L1.OR.TYPECMP.EQ.L2.OR.
     +    TYPECMP.EQ.C1.OR.TYPECMP.EQ.C2.OR.
     +    TYPECMP.EQ.R1.OR.TYPECMP.EQ.C2.OR.
     +    TYPECMP.EQ.I1.OR.TYPECMP.EQ.I3.OR.
     +    TYPECMP.EQ.R5.OR.TYPECMP.EQ.R6) THEN
      O.K. UP OR DOWN PROCEDURE
        ELSE
           E=0
           CALL ONCMDERR
           GO TO 100
        ENDIF
       ENDIF
       GO TO 100
      ENDIF

;* Set SIGNAL to NXTSIG
;
       SIGNAL=NXTSIG
       GO TO 200
       END
```

```
      SUBROUTINE SES
C
C*****************************************************************
C
C**           THIS ROUTINE DETERMINS
C**           COMPONENT OPERATIONAL STATE
C**           SUBSYSTEMS OPERATIONAL STATE
C**           HIGHEST OPERATIONAL MODE
C**           IF MODE DEMAND IS ACCEPTABLE
C**           THE OPTIMAL TRANSITION FROM ONE MODE TO THE NEXT
C
C*****************************************************************
C**************************VARIABLE LIST**************************
C*****************************************************************
C                    COSL----+
C                    COSC    1---)   Component operational states
C                    COSR    1       by sub-system, component
C                    COSI----+       and state number
C
C                    COIL----+
C                    COIC    1---)   Component operational indicator
C                    COIR    1       by sub-system component
C                    COLI----+
C
C                    SOSL----+
C                    SOSC    1---)   Sub-system operational states
C                    SOSR    1       by sub-system component, and
C                    SOSI----+       sub-system state number
C
C                    SOI --------)   Sub-system operational indicator
C                                    by sub-system
C
C                    SOSSU---+---)   System operational states
C                            +       by mode, sub-system, and
C                    SOSLP---+       sub-system state number
C
C                    NOF---------)   Number of functions
C                    NOS---------)   Number of states
C                    NOC---------)   Number of components
C                    ES----------)   Established states
C                    PROCK-------)   Procedure check
C
C                    SSU---------)   Start up mode
C                    SMM---------)   Main motor mode
C                    SLP---------)   Limited pony motor mode
C                    SSD---------)   Shut down mode
C
C*****************************************************************

C*************** END OF VARIABLE LIST ****************************
C*****************************************************************
C
      IMPLICIT INTEGER*2 (A-Z)

DIMENSION COSL(4,3),COSC(2,5),COSR(7,5),COSI(5,5)
     +          CIOL(4),COIC(2),COIR(7), COIL(5),
```

```
     +            SOSL(4),SOSC(2,3), SOSR(7,21),SOSI(5,6),
     +            SOI(4),
     +            SOSSU(4),SOSLP(4,4),
     +            NOF(4),NOS(4,18),NOC(4,18,ES(18,20,4),
     +            BST(18,3),PROCK(18,3)
C
      INCLUDE 'COMVAR.COM'
      INCLUDE 'KEYBSET.FOR'
      OUT = 9
C
C     WRITE(OUT,10)
C10    FORMAT(' SUBROUTINE SES ')
C
C*******************************************************************
C************* TABLES FOR THIS ROUTINE *****************************
C*******************************************************************
C
C*  Component operational states by sub-system,component,and state
number
C
C*  Lift system *
C
      COSL(1,1)=ONE_ONE
      COSL(1,2)=ZERO_ZERO
      COSL(1,3)=M_ZERO
      COSL(2k1)=ONE_ONE
      COSL(2,2)=ZERO_ZERO
      COSL(2,3)=M_ZERO
      COSL(3,1)=P_ONE
      COSL(3,2)=M_ZERO
      COSL(4,1)=P_ZERO
      COSL(4,2)=M_ZERO
C
C*  Cooling system *
C
      COSC(1,1)=ONE_ONE
      COSC(1,2)=ZERO_ZERO
      COSC(1,3)=S_ZERO
      COSC(1,4)=S_ONE
      COSC(1,5)=M_ZERO
      COSC(2,1)=ONE_ONE
      COSC(2,2)=ZERO_ZERO
      COSC(2,3)=S_ZERO
      COSC(2,4)=S_ONE
      COSC(2,5)=M_ZERO
C
C*  Recirculations system *
C
      COSR(1,1)=ONE_ONE
      COSR(1,2)=ZERO_ZERO
      COSR(1,3)=S_ZERO
      COSR(1,4)=S_ONE
      COSR(1,4)=M_ZERO
      COSR(2,1)=P_ZERO
      COSR(2,2)=M_ZERO
      COSR(3,1)=ONE_ONE
      COSR(3,2)=ZERO_ZERO
```

```
      COSR(3,3)=S_ZERO
      COSR(3,4)=S_ONE
      COSR(3,5)=M_ZERO
      COSR(4,1)=P_ZERO
      COSR(4,2)=M_ZERO
      COSR(5,1)=P_ZERO
      COSR(5,2)=P_ONE
      COSR(5,3)=M_ZERO
      COSR(6,1)=P_ZERO
      COSR(6,2)=P_ONE
      COSR(6,3)=M_ZERO
      COSR(7,1)=P_ZERO
      COSR(7,2)=M_ZERO
C
C*   Inventory system *
C
      COSI(1,1)=ONE_ONE
      COSI(1,2)=ZERO_ZERO
      COSI(1,3)=S_ONE
      COSI(1,4)=S_ZERO
      COSI(1,5)=M_ZERO
      COSI(2,1)=P_ZERO
      COSI(2,2)=P_ONE
      COSI(2,3)=M_ZERO
      COSI(3,1)=P_ZERO
      COSI(3,2)=P_ONE
      COSI(3,3)=M_ZERO
      COSI(4,1)=P_ZERO
      COSI(4,2)=P_ONE
      COSI(4,3)=M_ZERO
      COSI(5,1)=P_ZERO
      COSI(5,2)=M_ZERO
C
C****************************************************************
C*   Sub-system operational states
C    by sub-system, component, sub-system state number
C
C*   Lift system *
C
      SOSL(1)=1
      SOSL(2)=1
      SOSL(3)=1
      SOSL(4)=1

C*   Cooling system *

SOSC(1,1)=1
      SOSC(2,1)=1

SOSC(1,2)=1
      SOSC(2,2)=0

SOSC(1,3)=0
      SOSC(2,3)=1

*    Recirculation system *
```

```
      SOSR(1,1)=1
      SOSR(2,1)=1
      SOSR(3,1)=1
      SOSR(4,1)=1
      SOSR(5,1)=1
      SOSR(6,1)=1
      SOSR(7,1)=1
C
      SOSR(1,2)=1
      SOSR(2,2)=1
      SOSR(3,2)=0
      SOSR(4,2)=1
      SOSR(5,2)=1
      SOSR(6,2)=1
      SOSR(7,2)=1
C
      SOSR(1,3)=0
      SOSR(2,3)=1
      SOSR(3,3)=1
      SOSR(4,3)=1
      SOSR(5,3)=1
      SOSR(6,3)=1
      SOSR(7,3)=1
C
      SOSR(1,4)=1
      SOSR(2,4)=1
      SOSR(3,4)=1
      SOSR(4,4)=1
      SOSR(5,4)=1
      SOSR(6,4)=0
      SOSR(7,4)=1
C
      SOSR(1,5)=1
      SOSR(2,5)=1
      SOSR(3,5)=0
      SOSR(4,5)=1
      SOSR(5,5)=1
      SOSR(6,5)=0
      SOSR(7,5)=1
C
      SOSR(1,6)=0
      SOSR(2,6)=1
      SOSR(3,6)=1
      SOSR(4,6)=1
      SOSR(5,6)=1
      SOSR(6,6)=0
      SOSR(7,6)=1
C
      SOSR(1,7)=1
      SOSR(2,7)=1
      SOSR(3,7)=1
      SOSR(4,7)=1
      SOSR(5,7)=0
      SOSR(6,7)=1
      SOSR(7,7)=1
C
      SOSR(1,8)=1
      SOSR(2,8)=1
      SOSR(3,8)=0
      SOSR(4,8)=1
      SOSR(5,8)=0
      SOSR(6,8)=1
      SOSR(7,8)=1
C
      SOSR(1,9)=0
      SOSR(2,9)=1
      SOSR(3,9)=1
      SOSR(4,9)=1
      SOSR(5,9)=0
      SOSR(6,9)=1
      SOSR(7,9)=1
C
      SOSR(1,10)=1
      SOSR(2,10)=0
      SOSR(3,10)=1
      SOSR(4,10)=1
      SOSR(5,10)=1
      SOSR(6,10)=1
      SOSR(7,10)=1
C
      SOSR(1,11)=1
      SOSR(2,11)=1
      SOSR(3,11)=1
      SOSR(4,11)=0
      SOSR(5,11)=1
      SOSR(6,11)=1
      SOSR(7,11)=1
C
      SOSR(1,12)=0
      SOSR(2,12)=0
      SOSR(3,12)=1
      SOSR(4,12)=1
      SOSR(5,12)=1
      SOSR(6,12)=1
      SOSR(7,12)=1
C
      SOSR(1,13)=1
      SOSR(2,13)=1
      SOSR(3,13)=0
      SOSR(4,13)=1
      SOSR(5,13)=1
      SOSR(6,13)=1
      SOSR(7,13)=1
C
      SOSR(1,14)=1
      SOSR(2,14)=0
      SOSR(3,14)=1
      SOSR(4,14)=1
      SOSR(5,14)=1
      SOSR(6,14)=0
      SOSR(7,14)=1
C
      SOSR(1,15)=1
      SOSR(2,15)=0
```

```
      SOSR(3,15)=1
      SOSR(4,15)=1
      SOSR(5,15)=0
      SOSR(6,15)=1
      SOSR(7,15)=1
C
      SOSR(1,16)=0
      SOSR(2,16)=0
      SOSR(3,16)=1
      SOSR(4,16)=1
      SOSR(5,16)=1
      SOSR(6,16)=0
      SOSR(7,16)=1
C
      SOSR(1,17)=0
      SOSR(2,17)=0
      SOSR(3,17)=1
      SOSR(4,17)=1
      SOSR(5,17)=0
      SOSR(6,17)=1
      SOSR(7,17)=1
C
      SOSR(1,18)=1
      SOSR(2,18)=1
      SOSR(3,18)=1
      SOSR(4,18)=0
      SOSR(5,18)=1
      SOSR(6,18)=0
      SOSR(7,18)=1
C
      SOSR(1,19)=1
      SOSR(2,19)=1
      SOSR(3,19)=0
      SOSR(4,19)=0
      SOSR(5,19)=1
      SOSR(6,19)=0
      SOSR(7,19)=1
C
      SOSR(1,20)=1
      SOSR(2,20)=1
      SOSR(3,20)=1
      SOSR(4,20)=0
      SOSR(5,20)=0
      SOSR(6,20)=1
      SOSR(6,20)=1
C
      SOSR(1,21)=1
      SOSR(2,21)=1
      SOSR(3,21)=0
      SOSR(4,21)=0
      SOSR(5,21)=0
      SOSR(6,21)=1
      SOSR(7,21)=1
C
C* Inventory system *
C
      SOSI(1,1)=1
```

```
              SOSI(2,1)=1
              SOSI(3,1)=1
              SOSI(4,1)=1
              SOSI(5,1)=1
      C
              SOSI(1,2)=1
              SOSI(2,2)=0
              SOSI(3,2)=1
              SOSI(4,2)=1
              SOSI(5,2)=1
      C
              SOSI(1,3)=1
              SOSI(2,3)=1
              SOSI(3,3)=0
              SOSI(4,3)=1
              SOSI(5,3)=1
      C
              SOSI(1,4)=1
              SOSI(2,4)=0
              SOSI(3,4)=1
              SOSI(4,4)=0
              SOSI(5,4)=1
      C
              SOSI(1,5)=1
              SOSI(2,5)=1
              SOSI(3,5)=0
              SOSI(4,5)=0
              SOSI(5,5)=1
      C
              SOSI(1,6)=1
              SOSI(2,6)=1
              SOSI(3,6)=1
              SOSI(4,6)=0
              SOSI(5,6)=1
      C
      C******************************************************************
      C**System operational state
      C  by mode, sub-system, and system state number **
      C
      C* Startup and main motor (same systems must be operational) *
      C
              SOSSU(1)=1
              SOSSU(2)=1
              SOSSU(3)=1
              SOSSU(4)=1
      C
      C* Limited pony *
      C
              SOSLP(1,1)=1
              SOSLP(2,1)=1
              SOSLP(3,1)=1
              SOSLP(4,1)=1
      C
              SOSLP(1,2)=1
              SOSLP(2,2)=0
              SOSLP(3,2)=1
              SOSLP(4,2)=1
```

```
C
        SOSLP(1,3)=1
        SOSLP(2,3)=0
        SOSLP(3,3)=0
        SOSLP(4,3)=1
C
        SOSLP(1,4)=1
        SOSLP(2,4)=1
        SOSLP(3,4)=0
        SOSLP(4,4)=1
C
C*****************************************************************
C* Number of functions *
C
        NOF(1)=6
        NOF(2)=0
        NOF(3)=14
        NOF(4)=18
C
C*****************************************************************
C* Number of states per function *
C   by mode, function
C
C* Start up mode *
C
        NOS(1,1)=1
        NOS(1,2)=6
        NOS(1,3)=18
        NOS(1,4)=4
        NOS(1,5)=1
        NOS(1,6)=20
C
C* Main motor mode *
C
        NOS(2,1)=2
        NOS(2,2)=2
        NOS(2,3)=2
        NOS(2,4)=2
        NOS(2,5)=6
        NOS(2,6)=18
        NOS(2,7)=4
        NOS(2,8)=1
        NOS(2,9)=20
C
C* Limited pony motor mode *
C
        NOS(3,1)=2
        NOS(3,2)=2
        NOS(3,3)=2
        NOS(3,4)=2
        NOS(3,5)=3
        NOS(3,6)=3
        NOS(3,7)=3
        NOS(3,8)=3
        NOS(3,9)=3
        NOS(3,10)=3
        NOS(3,11)=4
```

```
              NOS(3,12)=4
              NOS(3,13)=3
              NOS(3,14)=20
C
C* Shut down mode *
C
              NOS(4,1)=3
              NOS(4,2)=3
              NOS(4,3)=3
              NOS(4,4)=3
              NOS(4,5)=3
              NOS(4,6)=3
              NOS(4,7)=3
              NOS(4,8)=3
              NOS(4,9)=3
              NOS(4,10)=3
              NOS(4,11)=4
              NOS(4,12)=4
              NOS(4,13)=3
              NOS(4,14)=3
              NOS(4,15)=3
              NOS(4,16)=3
              NOS(4,17)=4
              NOS(4,18)=3
C
C*********************************************************************
C* Number of components per function*
C   by mode, function
C
C* Start up mode *
C
              NOC(1,1)=4
              NOC(1,2)=2
              NOC(1,3)=4
              NOC(1,4)=2
              NOC(1,5)=1
              NOC(1,6)=5
C
C* Main motor mode *
C
              NOC(2,1)=1
              NOC(2,2)=1
              NOC(2,3)=1
              NOC(2,4)=1
              NOC(2,5)=2
              NOC(2,6)=4
              NOC(2,7)=2
              NOC(2,8)=1
              NOC(2,9)=5
C
C* Limited pony motor mode *
C
              NOC(3,1)=1
              NOC(3,2)=1
              NOC(3,3)=1
              NOC(3,4)=1
              NOC(3,5)=1
```

```
        NOC(3,6=1
        NOC(3,7)=1
        NOC(3,8)=1
        NOC(3,9)=1
        NOC(3,10)=1
        NOC(3,11)=1
        NOC(3,12)=1
        NOC(3,13)=1
        NOC(3,14)=1
        NOC(3,15)=1
        NOC(3,16)=1
        NOC(3,17)=1
        NOC(3,18)=1
C
C* Shut down mode *
C
        NOC(4,1)=1
        NOC(4,2)=1
        NOC(4,3)=1
        NOC(4,4)=1
        NOC(4,5)=1
        NOC(4,6=1
        NOC(4,7)=1
        NOC(4,8)=1
        NOC(4,9)=1
        NOC(4,10)=1
        NOC(4,11)=1
        NOC(4,12)=1
        NOC(4,13)=1
        NOC(4,14)=1
        NOC(4,15)=1
        NOC(4,16)=1
        NOC(4,17)=1
        NOC(4,18)=1
C
C****************************************************************
C* Established states *
C    by component,state,mode
C
C* Start up mode *
C
C*      Component L1
C
C*      Component L2
C'      ES(2,1,1)=ONE_ONE
C
C*      Component L3
C
        ES(3,1,1)=P_ONE
C
C*      Component :4
C
        ES(4,1,1)-P_ZERO
C
C*      Component C1
C
        ES(5,1,1)=ONE_ONE
```

```
        ES(5,2,1)=ONE_ONE
        ES(5,3,1)=ONE_ONE
        ES(5,4,1)=S_ONE
        ES(5,5,1)=M_F
        ES(5,6,1)=M_ZERO
C
C*      Componenet C2
C
        ES(6,1,1)=S_ZERO
        ES(6,2,1)=M_F
        ES(6,3,1)=M_ZERO
        ES(6,4,1)=ONE_ONE
        ES(6,5,1)=ONE_ONE
        ES(6,6,1)=ONE_ONE
C
C*      Component
C
        ES(7,1,1)=ONE_ONE
        ES(7,2,1)=ONE_ONE
        ES(7,3,1)=ONE_ONE
        ES(7,4,1)=ONE_ONE
        ES(7,5,1)=ONE_ONE
        ES(7,6,1)=ONE_ONE
        ES(7,7,1)=ONE_ONE
        ES(7,8,1)=ONE_ONE
        ES(7,9,1)=ONE_ONE
        ES(7,10,1)=S_ZERO
        ES(7,11,1)=S_ZERO
        ES(7,12,1)=S_ZERO
        ES(7,13,1)=M_F
        ES(7,14,1)=M_F
        ES(7,15,1)=M_F
        ES(7,16,1)=M_ZERO
        ES(7,17,1)=M_ZERO
        ES(7,18,1)=M_ZERO
C
C*      Component
C
        ES(8,1,1)=P_ZERO
        ES(8,2,1)=P_ZERO
        ES(8,3,1)=P_ZERO
        ES(8,4,1)=P_ZERO
        ES(8,5,1)=P_ZERO
        ES(8,6,1)=P_ZERO
        ES(8,7,1)=P_ZERO
        ES(8,8,1)=P_ZERO
        ES(8,9,1)=P_ZERO
        ES(8,10,1)=P_ZERO
        ES(8,11,1)=M_ZERO
        ES(8,12,1)=M_F
        ES(8,13,1)=P_ZERO
        ES(8,14,1)=M_ZERO
        ES(8,15,1)=M_F
        ES(8,16,1)=P_ZERO
        ES(8,17,1)=M_ZERO
        ES(8,18,1)=M_F
C
```

```
C*      Component R3
C
        ES(9,1,1)=S_ZERO
        ES(9,2,1)=S_ZERO
        ES(9,3,1)=S_ZERO
        ES(9,4,1)=M_F
        ES(9,5,1)=M_F
        ES(9,6,1)=M_F
        ES(9,7,1)=M_ZERO
        ES(9,8,1)=M_ZERO
        ES(9,9,1)=ONE_ONE
        ES(9,10,1)=ONE_ONE
        ES(9,11,1)=ONE_ONE
        ES(9,12,1)=ONE_ONE
        ES(9,13,1)=ONE_ONE
        ES(9,14,1)=ONE_ONE
        ES(9,15,1)=ONE_ONE
        ES(9,16,1)=ONE_ONE
        ES(9,17,1)=ONE_ONE
        ES(9,18,1)=ONE_ONE
C
C*      Component R4
C
        ES(10,1,1)=P_ZERO
        ES(10,2,1)=M_ZERO
        ES(10,3,1)=M_F
        ES(10,4,1)=P_ZERO
        ES(10,5,1)=M_ZERO
        ES(10,6,1)=M_F
        ES(10,7,1)=P_ZERO
        ES(10,8,1)=M_ZERO
        ES(10,9,1)=M_F
        ES(10,10,1)=P_ZERO
        ES(10,11,1)=P_ZERO
        ES(10,12,1)=P_ZERO
        ES(10,13,1)=P_ZERO
        ES(10,14,1)=P_ZERO
        ES(10,15,1)=P_ZERO
        ES(10,16,1)=P_ZERO
        ES(10,17,1)=P_ZERO
        ES(10,18,1)=P_ZERO
C
C*      Component R5
C
        ES(11,1,1)=P_ONE
        ES(11,2,1)=P_ONE
        ES(11,3,1)=P_ZERO
        ES(11,4,1)=F_ZERO
C
C*      Component R6
C
        ES(12,1,1)=P_ZERO
        ES(12,2,1)=F_ZERO
        ES(12,3,1)=P_ONE
        ES(12,4,1)=P_ONE
C
C*      Component R7
C
        ES(13,4,1)=P_ZERO
C
C*      Component I1
C
        ES(14,1,1)=ZERO_ZERO
        ES(14,2,1)=ZERO_ZERO
        ES(14,3,1)=ZERO_ZERO
        ES(14,4,1)=ZERO_ZERO
        ES(14,5,1)=ZERO_ZERO
        ES(14,6,1)=ZERO_ZERO
        ES(14,7,1)=ZERO_ZERO
        ES(14,8,1)=ZERO_ZERO
        ES(14,9,1)=ZERO_ZERO
        ES(14,10,1)=ZERO_ZERO
        ES(14,11,1)=ONE_ONE
        ES(14,12,1)=ONE_ONE
        ES(14,13,1)=ONE_ONE
        ES(14,14,1)=ONE_ONE
        ES(14,15,1)=ONE_ONE
        ES(14,16,1)=ONE_ONE
        ES(14,17,1)=ONE_ONE
        ES(14,18,1)=ONE_ONE
        ES(14,19,1)=ONE_ONE
        ES(14,20,1)=ONE_ONE
C
C*      Component I2
C
        ES(15,1,1)=P_ZERO
        ES(15,2,1)=P_ZERO
        ES(15,3,1)=P_ZERO
        ES(15,4,1)=M_ZERO
        ES(15,5,1)=M_F
        ES(15,6,1)=P_ZERO
        ES(15,7,1)=P_ZERO
        ES(15,8,1)=P_ZERO
        ES(15,9,1)=M_ZERO
        ES(15,10,1)=M_F
        ES(15,11,1)=P_ONE
        ES(15,12,1)=P_ONE
        ES(15,13,1)=P_ONE
        ES(15,14,1)=M_ZERO
        ES(15,15,1)=M_F
        ES(15,16,1)=P_ONE
        ES(15,17,1)=P_ONE
        ES(15,18,1)=P_ONE
        ES(15,19,1)=M_ZERO
        ES(15,20,1)=M_F
C
C*      Component I3
C
        ES(16,1,1)=P_ZERO
        ES(16,2,1)=M_ZERO
        ES(16,3,1)=M_F
        ES(16,4,1)=P_ZERO
        ES(16,5,1)=P_ZERO
        ES(16,6,1)=P_ZERO
```

```
      ES(16,7,1)=M_ZERO
      ES(16,8,1)=M_F
      ES(16,9,1)=P_ZERO
      ES(16,10,1)=P_ZERO
      ES(16,11,1)=P_ZERO
      ES(16,12,1)=M_ZERO
      ES(16,13,1)=M_F
      ES(16,14,1)=P_ONE
      ES(16,15,1)=P_ONE
      ES(16,16,1)=P_ZERO
      ES(16,17,1)=M_ZERO
      ES(16,18,1)=M_F
      ES(16,19,1)=P_ONE
      ES(16,20,1)=P_ONE
C
C*    Component I4
C
      ES(17,1,1)=P_ONE
      ES(17,2,1)=P_ONE
      ES(17,3,1)=P_ONE
      ES(17,4,1)=P_ONE
      ES(17,5,1)=P_ONE
      ES(17,6,1)=F_ONE
      ES(17,7,1)=F_ONE
      ES(17,8,1)=F_ONE
      ES(17,9,1)=F_ONE
      ES(17,10,1)=F_ONE
      ES(17,11,1)=P_ZERO
      ES(17,12,1)=P_ZERO
      ES(17,13,1)=P_ZERO
      ES(17,14,1)=P_ZERO
      ES(17,15,1)=P_ZERO
      ES(17,16,1)=F_ZERO
      ES(17,17,1)=F_ZERO
      ES(17,18,1)=F_ZERO
      ES(17,19,1)=F_ZERO
      ES(17,20,1)=F_ZERO
C
C*    Component I5
C
      ES(18,1,1)=P_ZERO
      ES(18,2,1)=P_ZERO
      ES(18,3,1)=P_ZERO
      ES(18,4,1)=P_ZERO
      ES(18,5,1)=P_ZERO
      ES(18,6,1)=P_ZERO
      ES(18,7,1)=P_ZERO
      ES(18,8,1)=P_ZERO
      ES(18,9,1)=P_ZERO
      ES(18,10,1)=P_ZERO
      ES(18,11,1)=P_ZERO
      ES(18,12,1)=P_ZERO
      ES(18,13,1)=P_ZERO
      ES(18,14,1)=P_ZERO
      ES(18,15,1)=P_ZERO
      ES(18,16,1)=P_ZERO
      ES(18,17,1)=P_ZERO
      ES(18,18,1)=P_ZERO
C*    Main motor mode *
C
C*    Component L1
C
      ES(1,1,2)=ZERO_ZERO
      ES(1,2,2)=M_ZERO
C
C*    Component L2
C
      ES(2,1,2)=ZERO_ZERO
      ES(2,2,2)=M_ZERO
C
C*    Component L3
C
      ES(3,1,2)=P_ONE
      ES(3,2,2)=M_ZERO
C
C*    Component L4
C
      ES(4,1,2)=P_ZERO
      ES(4,2,2)=M_ZERO
C
C*    Component C1
C
      ES(5,1,2)=ONE_ONE
      ES(5,2,2)=ONE_ONE
      ES(5,3,2)=ONE_ONE
      ES(5,4,2)=S_ZERO
      ES(5,5,2)=M_F
      ES(5,6,2)=M_ZERO
C
C*    Component C2
C
      ES(6,1,2)=S_ZERO
      ES(6,2,2)=M_F
      ES(6,3,2)=M_ZERO
      ES(6,4,2)=ONE_ONE
      ES(6,5,2)=ONE_ONE
      ES(6,6,2)=ONE_ONE
C
C*    Component R1
C
      ES(7,1,2)=ONE_ONE
      ES(7,2,2)=ONE_ONE
      ES(7,3,2)=ONE_ONE
      ES(7,4,2)=ONE_ONE
      ES(7,5,2)=ONE_ONE
      ES(7,6,2)=ONE_ONE
      ES(7,7,2)=ONE_ONE
      ES(7,8,2)=ONE_ONE
      ES(7,9,2)=ONE_ONE
      ES(7,10,2)=S_ZERO
      ES(7,11,2)=S_ZERO
      ES(7,12,2)=S_ZERO
      ES(7,13,2)=M_F
      ES(7,14,2)=M_F
```

```
        ES(7,15,2)=M_F
        ES(7,16,2)=M_ZERO
        ES(7,17,2)=M_ZERO
        ES(7,18,2)=M_ZERO
C
C*    Component R2
C
        ES(8,1,2)=P_ZERO
        ES(8,2,2)=P_ZERO
        ES(8,3,2)=P_ZERO
        ES(8,4,2)=P_ZERO
        ES(8,5,2)=P_ZERO
        ES(8,6,2)=P_ZERO
        ES(8,7,2)=P_ZERO
        ES(8,8,2)=P_ZERO
        ES(8,9,2)=P_ZERO
        ES(8,10,2)=P_ZERO
        ES(8,11,2)=P_ZERO
        ES(8,12,2)=M_F
        ES(8,13,2)=P_ZERO
        ES(8,14,2)=M_ZERO
        ES(8,15,2)=M_F
        ES(8,16,2)=P_ZERO
        ES(8,17,2)=M_ZERO
        ES(8,18,2)=M_F
C
C*    Component R3
C
        ES(9,1,2)=S_ZERO
        ES(9,2,2)=S_ZERO
        ES(9,3,2)=S_ZERO
        ES(9,4,2)=M_F
        ES(9,5,2)=M_F
        ES(9,6,2)=M_F
        ES(9,7,2)=M_ZERO
        ES(9,8,2)=M_ZERO
        ES(9,9,2)=M_ZERO
        ES(9,10,2)=ONE_ONE
        ES(9,11,2)=ONE_ONE
        ES(9,11,2)=ONE_ONE
        ES(9,12,2)=ONE_ONE
        ES(9,13,2)=ONE_ONE
        ES(9,14,2)=ONE_ONE
        ES(9,15,2)=ONE_ONE
        ES(9,16,2)=ONE_ONE
        ES(9,17,2)=ONE_ONE
        ES(9,18,2)=ONE_ONE
C
C*    Component R4
C
        ES(10,1,2)=P_ZERO
        ES(10,2,2)=M_ZERO
        ES(10,3,2)=M_F
        ES(10,4,2)=P_ZERO
        ES(10,5,2)=M_ZERO
        ES(10,6,2)=M_F
        ES(10,7,2)=P_ZERO
        ES(10,8,2)=M_ZERO
        ES(10,9,2)=M_F
        ES(10,11,2)=P_ZERO
        ES(10,12,2)=P_ZERO
        ES(10,13,2)=P_ZERO
        ES(10,14,2)=P_ZERO
        ES(10,15,2)=P_ZERO
        ES(10,16,2)=P_ZERO
        ES(10,17,2)=P_ZERO
        ES(10,18,2)=P_ZERO
C
C*    Component R5
C
        ES(11,1,2)=P_ONE
        ES(11,2,2)=P_ONE
        ES(11,3,2)=P_ZERO
        ES(11,4,2)=F_ZERO
C
C*    Component R6
C
        ES(12,1,2)=P_ZERO
        ES(12,2,2)=F_ZERO
        ES(12,3,2)=P_ONE
        ES(12,4,2)=P_ONE
C
C*    Component R7
C
        ES(13,1,2)=P_ZERO
C
C*    Component I1
C
        ES(14,1,2)=ZERO_ZERO
        ES(14,2,2)=ZERO_ZERO
        ES(14,3,2)=ZERO_ZERO
        ES(14,4,2)=ZERO_ZERO
        ES(14,5,2)=ZERO_ZERO
        ES(14,6,2)=ZERO_ZERO
        ES(14,7,2)=ZERO_ZERO
        ES(14,8,2)=ZERO_ZERO
        ES(14,9,2)=ZERO_ZERO
        ES(14,10,2)=ZERO_ZERO
        ES(14,11,2)=ONE_ONE
        ES(14,12,2)=ONE_ONE
        ES(14,13,2)=ONE_ONE
        ES(14,14,2)=ONE_ONE
        ES(14,15,2)=ONE_ONE
        ES(14,16,2)=ONE_ONE
        ES(14,17,2)=ONE_ONE
        ES(14,18,2)=ONE_ONE
        ES(14,19,2)=ONE_ONE
        ES(14,20,2)=ONE_ONE
C
C*    Component I2
C
        ES(15,1,2)=P_ZERO
        ES(15,2,2)=P_ZERO
        ES(15,3,2)=P_ZERO
```

```
      ES(15,4,2)=M_ZERO
      ES(15,5,2)=M_F
      ES(15,6,2)=P_ZERO
      ES(15,7,2)=P_ZERO
      ES(15,8,2)=M_ZERO
      ES(15,9,2)=M_F
      ES(15,10,2)=P_ONE
      ES(15,11,2)=P_ONE
      ES(15,12,2)=P_ONE
      ES(15,13,2)=P_ONE
      ES(15,14,2)=M_ZERO
      ES(15,15,2)=M_F
      ES(15,16,2)=P_ONE
      ES(15,17,2)=P_ONE
      ES(15,18,2)=P_ONE
      ES(15,19,2)=M_ZERO
      ES(15,20,2)=M_F
C
C*    Component I3
C
      ES(16,1,2)=P_ZERO
      ES(16,2,2)=M_ZERO
      ES(16,3,2)=M_F
      ES(16,4,2)=P_ZERO
      ES(16,5,2)=P_ZERO
      ES(16,6,2)=P_ZERO
      ES(16,7,2)=M_ZERO
      ES(16,8,2)=M_F
      ES(16,9,2)=M_ZERO
      ES(16,10,2)=P_ZERO
      ES(16,11,2)=P_ZERO
      ES(16,12,2)=M_ZERO
      ES(16,13,2)=M_F
      ES(16,14,2)=P_ONE
      ES(16,15,2)=P_ONE
      ES(16,16,2)=P_ZERO
      ES(16,17,2)=M_ZERO
      ES(16,18,2)=M_F
      ES(16,19,2)=P_ONE
      ES(16,20,2)=P_ONE
C
C*    Component I4
C
      ES(17,1,2)=P_ONE
      ES(17,2,2)=P_ONE
      ES(17,3,2)=P_ONE
      ES(17,4,2)=P_ONE
      ES(17,5,2)=P_ONE
      ES(17,6,2)=F_ONE
      ES(17,7,2)=F_ONE
      ES(17,8,2)=F_ONE
      ES(17,9,2)=F_ONE
      ES(17,10,2)=F_ONE
      ES(17,11,2)=P_ZERO
      ES(17,12,2)=P_ZERO
      ES(17,13,2)=P_ZERO
      ES(17,14,2)=P_ZERO
      ES(17,15,2)=P_ZERO
      ES(17,16,2)=F_ZERO
      ES(17,17,2)=F_ZERO
      ES(17,18,2)=F_ZERO
      ES(17,19,2)=F_ZERO
      ES(17,20,2)=F_ZERO
C
C*    Component I5
C
      ES(18,1,2)=P_ZERO
      ES(18,2,2)=P_ZERO
      ES(18,3,2)=P_ZERO
      ES(18,4,2)=P_ZERO
      ES(18,5,2)=P_ZERO
      ES(18,6,2)=P_ZERO
      ES(18,7,2)=P_ZERO
      ES(18,8,2)=P_ZERO
      ES(18,9,2)=P_ZERO
      ES(18,10,2)=P_ZERO
      ES(18,11,2)=P_ZERO
      ES(18,12,2)=P_ZERO
      ES(18,13,2)=P_ZERO
      ES(18,14,2)=P_ZERO
      ES(18,15,2)=P_ZERO
      ES(18,16,2)=P_ZERO
      ES(18,17,2)=P_ZERO
      ES(18,18,2)=P_ZERO
      ES(18,19,2)=P_ZERO
      ES(18,20,2)=P_ZERO
C
C* Limited pony motor mode *
C*    Component L1
C
      ES(1,1,3)=ZERO_ZERO
      ES(1,2,3)=ZERO_ZERO
C
C*    Component L2
C
      ES(2,1,3)=ZERO_ZERO
      ES(2,2,3)=M_ZERO
C
C*    Component L3
C
      ES(3,1,3)=P_ONE
      ES(3,2,3)=M_ZERO
C
C*    Component L4
C
      ES(4,1,3)=P_ZERO
      ES(4,2,3)=M_ZERO
C
C*    Component C1
C
      ES(5,1,3)=ZERO_ZERO
      ES(5,2,3)=M_F
      ES(5,3,3)=M_ZERO
C
```

```
C*      Component C2
C
        ES(6,1,3)=ZERO_ZERO
        ES(6,2,3)=M_F
        ES(6,3,3)=M_ZERO
C
C*      Component R1
C
        ES(7,1,3)=ZERO_ZERO
        ES(7,2,3)=M_F
        ES(7,3,3)=M_ZERO
C
C*      Component R2
C
        ES(8,1,3)=P_ZERO
        ES(8,2,3)=M_F
        ES(8,3,3)=M_ZERO
C
C*      Component R3
C
        ES(9,1,3)=ZERO_ZERO
        ES(9,2,3)=M_ZERO
        ES(9,3,3)=M_F
C
C*      Component R4
C
        ES(10,1,3)=ZERO_ZERO
        ES(10,2,3)=M_ZERO
        ES(10,2,3)=M_F
C
C*      Component R5
C
        ES(11,1,3)=P_ONE
        ES(11,2,3)=P_ZERO
        ES(11,3,3)=M_ZERO
        ES(11,4,3)=M_F
C
C*      Component R6
C
        ES(12,1,3)=P_ONE
        ES(12,2,3)=P_ZERO
        ES(12,3,3)=M_ZERO
        ES(12,4,3)=M_F
C
C*      Component R7
C
        ES(13,1,3)=P_ZERO
        ES(13,2,3)=M_ZERO
        ES(13,3,3)=M_F
C
C*      Component RI1
C
        ES(14,1,3)=ZERO_ZERO
        ES(14,2,3)=ZERO_ZERO
        ES(14,3,3)=ZERO_ZERO
        ES(14,4,3)=ZERO_ZERO
        ES(14,5,3)=ZERO_ZERO
        ES(14,6,3)=ZERO_ZERO
        ES(14,7,3)=ZERO_ZERO
        ES(14,9,3)=ZERO_ZERO
        ES(14,10,3)=ZERO_ZERO
        ES(14,11,3)=ONE_ONE
        ES(14,12,3)=ONE_ONE
        ES(14,13,3)=ONE_ONE
        ES(14,14,3)=ONE_ONE
        ES(14,15,3)=ONE_ONE
        ES(14,16,3)=ONE_ONE
        ES(14,17,3)=ONE_ONE
        ES(14,18,3)=ONE_ONE
        ES(14,19,3)=ONE_ONE
        ES(14,20,3)=ONE_ONE
C
C*      Component RI2
C
        ES(15,1,3)=P_ZERO
        ES(15,2,3)=P_ZERO
        ES(15,3,3)=P_ZERO
        ES(15,4,3)=M_ZERO
        ES(15,5,3)=M_F
        ES(15,6,3)=P_ZERO
        ES(15,7,3)=P_ZERO
        ES(15,8,3)=P_ZERO
        ES(15,9,3)=M_ZERO
        ES(15,10,3)=M_F
        ES(15,11,3)=P_ONE
        ES(15,12,3)=P_ONE
        ES(15,13,3)=P_ONE
        ES(15,14,3)=M_ZERO
        ES(15,15,3)=M_ZERO
        ES(15,16,3)=P_ONE
        ES(15,17,3)=P_ONE
        ES(15,18,3)=P_ONE
        ES(15,19,3)=M_ZERO
        ES(15,20,3)=M_F
C
C*      Component 13
C
        ES(16,1,3)=P_ZERO
        ES(16,2,3)=P_ZERO
        ES(16,3,3)=M_F
        ES(16,4,3)=P_ZERO
        ES(16,5,3)=P_ZERO
        ES(16,6,3)=P_ZERO
        ES(16,7,3)=M_ZERO
        ES(16,8,3)=M_F
        ES(16,9,3)=P_ZERO
        ES(16,10,3)=P_ZERO
        ES(16,11,3)=P_ZERO
        ES(16,12,3)=M_ZERO
        ES(16,13,3)=M_F
        ES(16,14,3)=P_ONE
        ES(16,15,3)=P_ONE
        ES(16,16,3)=P_ZERO
```

```
          ES(16,17,3)=M_ZERO
          ES(16,18,3)=M_F
          ES(16,19,3)=P_ONE
          ES(16,20,3)=P∓ONE
C
C*        Component 14
C
          ES(17,1,3)=P_ONE
          ES(17,2,3)=P_ONE
          ES(17,3,3)=P_ONE
          ES(17,4,3)=P_ONE
          ES(17,5,3)=P_ONE
          ES(17,6,3)=F_ONE
          ES(17,7,3)=F_ONE
          ES(17,8,3)=F_ONE
          ES(17,9,3)=F_ONE
          ES(17,10,3)=F_ONE
          ES(17,11,3)=P_ZERO
          ES(17,12,3)=P_ZERO
          ES(17,13,3)=P_ZERO
          ES(17,14,3)=P_ZERO
          ES(17,15,3)=P_ZERO
          ES(17,16,3)=F_ZERO
          ES(17,17,3)=F_ZERO
          ES(17,18,3)=F_ZERO
          ES(17,19,3)=F_ZERO
          ES(17,20,3)=F_ZERO
C
C*        Component 15
C
          ES(18,1,3)=P_ZERO
          ES(18,2,3)=P_ZERO
          ES(18,3,3)=P_ZERO
          ES(18,4,3)=P_ZERO
          ES(18,5,3)=P_ZERO
          ES(18,6,3)=P_ZERO
          ES(18,7,3)=P_ZERO
          ES(18,8,3)=P_ZERO
          ES(18,9,3)=P_ZERO
          ES(18,10,3)=P_ZERO
          ES(18,11,3)=P_ZERO
          ES(18,12,3)=P_ZERO
          ES(18,13,3)=P_ZERO
          ES(18,14,3)=P_ZERO
          ES(18,15,3)=P_ZERO
          ES(18,16,3)=P_ZERO
          ES(18,17,3)=P_ZERO
          ES(18,18,3)=P_ZERO
          ES(18,19,3)=P_ZERO
          ES(18,20,3)=P_ZERO
C
C* Shut down mode *
C
C*        Component L1
C
          ES(1,1,4)=ZERO_ZERO
          ES(1,2,4)=M_F
          ES(1,3,4)=M_ZERO
C
C*        Component L2
C
          ES(2,1,4)=ZERO_ZERO
          ES(2,2,4)=M_F
          ES(2,3,4)=M_ZERO
C
C*        Component L3
C
          ES(3,1,4)=P_ONE
          ES(3,2,4)=M_F
          ES(3,3,4)=M_ZERO
C
C*        Component L4
C
          ES(4,1,4)=P_ZERO
          ES(4,2,4)=M_F
          ES(4,3,4)=M_ZERO
C
C*        Component C1
C
          ES(5,1,4)=ZERO_ZERO
          ES(5,2,4)=M_F
          ES(5,3,4)=M_ZERO
C
C*        Component C2
C
          ES(6,1,4)=ZERO_ZERO
          ES(6,2,4)=M_F
          ES(6,3,4)=M_ZERO
C
C*        Component R1
C
          ES(7,1,4)=ZERO_ZERO
          ES(7,2,4)=M_F
          ES(7,3,4)=M_ZERO
C
C*        Component R2
C
          ES(8,1,4)=P_ZERO
          ES(8,2,4)=M_F
          ES(8,3,4)=M_ZERO
C
C*        Component R3
C
          ES(9,1,4)=ZERO_ZERO
          ES(9,2,4)=M_ZERO
          ES(9,3,4)=M_F
C
C*        Component R4
C
          ES(10,1,4)=P_ZERO
          ES(10,2,4)=M_ZERO
          ES(10,3,4)=M_F
C
C*        Component R5
```

```
C
      ES(11,1,4)=P_ZERO
      ES(11,2,4)=P_ONE
      ES(11,3,4)=M_ZERO
      ES(11,4,4)=M_F
C
C*    Component R6
C
      ES(12,1,4)=P_ZERO
      ES(12,2,4)=P_ONE
      ES(12,3,4)=M_ZERO
      ES(12,4,4)=M_F
C
C*    Component R7
C
      ES(13,1,4)=P_ZERO
      ES(13,2,4)=M_ZERO
      ES(13,3,4)=M_F
C
C*    Component R11
C
      ES(14,1,4)=ZERO_ZERO
      ES(14,2,4)=M_F
      ES(14,3,4)=M_ZERO
C
C*    Component R12
C
      ES(15,1,4)=P_ZERO
      ES(15,2,4)=M_F
      ES(15,3,4)=M_ZERO
C
C*    Component R13
C
      ES(16,1,4)=P_ZERO
      ES(16,2,4)=M_F
      ES(16,3,4)=M_ZERO
C
C*    Component R14
C
      ES(17,1,4)=P_ZERO
      ES(17,2,4)=P_ONE
      ES(17,3,4)=M_F
      ES(17,4,4)=M_ZERO
C
C*    Component R15
C
      ES(18,1,4)=P_ZERO
      ES(18,2,4)=M_ZERO
      ES(18,3,4)=M_F C*
C*                    END OF TABLES
C*
C
C
C*
C*    2.1 DETERMINE COMPONENT STATUS FOR EACH SUB-SYSTEM
```

```
C
C*  J is the component number
C*  JJ is the component
C*  JJJ is the state number
C
C** 2.1 Determin component status for lift subsystem
C
C
          J=0
          DO 101 JJ=1,4
           J=J+1
           DO 102 JJJ=1,3
             if (VCS(J).EQ.COSL(JJ,JJJ)) then
              COIL(JJ)=1
              GOTO 101
              endif
             COIL(JJ)=0
102        CONTINUE
101        CONTINUE
C
C** 2.1 Determin component status for cooling sub-system
C
C         J=4
          DO 111 JJ=1,2
           J=J+1
            DO 112 JJJ=1,5
             if (VCS(J).EQ.COSC(JJ,JJJ)) then
                                        COIC(JJ)=1
                                        GOTO 111
                                        endif
                                        COIC(JJ)=0
112         CONTINUE
111         CONTINUE
C
C**2.1 Determin component status for recirculation sub-system
C
C         J=6
          DO 120 JJ=1,7
           J=J+1
            DO 121 JJJ=1,5
              if (VCS(J).EQ.COSR(JJ,JJJ)) then
                                        COIR(JJ)=0
121         CONTINUE
120 CONTINUE
C
C**2.1 Determin component status for inventory sub-system
C
C         J=13
          DO 130 JJ=1,5
           J=J+1
            DO 131 JJJ=1,5
                                        if (VCS(J).EQ.COSI(JJ,JJJ))
                                        then
                                          COII(JJ)=1
                                          GOTO 130
                                        endif
             COII(JJ)=0
```

```
131     CONTINUE
130 CONTINUE
        WRITE(OUT,900) COIL,COIC,COIR,COII
900 FORMAT(' 2.1 COIL=' ,412,' COIC=' ,212,' COIR=',712,' COII=',512)
        WRITE OUT,901) VCS
901 FORMAT(' VCS = '1814
C
C** Determin sub-system status
C* Store results in SOI (subsystem operational indicator)file
C* SOI(1)=Lift sub-system
C* SOI(2)=Cooling sub-system
C* SOI(3)=Recirculation sub-system
C* SOI(4)=Inventory sub-system
C
C
C* 2.2 Lift sub-system
C*      by component and sub-system state number
C
        if (COIL(1).EQ.SOSL(1).AND.COIL(2).EQ.SOSL(2).AND.
     +     COIL(3).EQ.SOSL(3).AND.COIL(4).EQ.SOSL(4)) then
          SOI(1)=1
        else
          SOI(1)=0
        endif
C
C* 2.2 Cooling sub-system operational check
C
C I is the sub-system state number
C
        DO 140 I=1,3
          if (COIC(1).EQ.SOSC(1,I).AND.COIC(2).EQ.SOSC(2,I)) then
            SOI(2)=1
            GOTO 141
          endif
          SOI(2)=0
140     CONTINUE
141     CONTINUE
C
C* 2.2 Recirculation sub-system operational check
C
        DO 150 I=1,21
          if (COIR(1).EQ.SOSR(1,I).AND.COIR(2).EQ.SOSR(2,I).AND
     +       COIR(3).EQ.SOSR(3,I).AND.COIR(4).EQ.SOSR(4,I).AND.
     +       COIR(5).EQ.SOSR(5,I).AND.COIR(6).EQ.SOSR(6,I).AND.
     +       COIR(7).EQ.SOSR(7,I)) then
            SOI(3)=1
            GOTO 151
          endif
          SOI(3)=0
150     CONTINUE
151     CONTINUE
C
C** 2.2 Inventory sub-system operational check
C
        DO 160 I=1,6
          if (COII(1).EQSOSI(1,I). AND.COII(2).EQ.SOSI(2,I).AND.
     +       COII(3).EQ.SOSI(3,I).AND.COII(4).EQ.SOSI(4,I).AND.
```

```
     +          COII(5).EQ.SOSI(5,I)) then
                SOI(4)=0
160           CONTINUE
161         CONTINUE
            WRITE(OUT,905) SOI
905         FORMAT(' 2.2 SOI = ',4I4)
C
C** Check operability in the STARTUP and MAIN MOTOR mode
C** by sub-system and system state number
C** (they need the same sub-systems operational)
C
            if (SOI(1).EQ.SOSSU(1).AND.SOI(2).EQ.SOSSU(2).AND.
     +         SOI(3).EQ.SOSSU(3).AND.SOI(4).EQ.SOSSU(4)) then
              HIMOD=SSU
              GOTO 170
            endif
C
C** Check for LIMITED PONY MOTOR mode
C
            DO 180 I=1,4
              if (SOI(1).EQ.SOSLP(1,I).AND.SOI(2).EQ.SOSLP(2.I).AND
     +           SOI(3).EQ.SOSLP(3.I).AND.SOI(4).EQ.SOSLP(4.I)) then
                HIMOD=SLP
                GOTO 170
              endif
180         CONTINUE
C
C** If you get to this point the only acceptable mode is SHUT DOWN ..
C
            HIMOD=SSD
C
170         CONTINUE
            WRITE(OUT,910) HIMOD
            FORMAT(' 2.3.1 HIMOD = ',I4)
C
C***
C** 2.3.2 Select next mode (check to see if mode demand is
acceptable)
C
            if (MODD.LE.HIMOD) then
C Turn Loss Of Control In Demand Mode error message OFF
              CALL OFFLOC
              NXTMOD=CURMOD
              PRVSMOD=CURMOD
              PROCF=1
              CALL RMC
              GOTO 200
            else
              if (CURMOD.LE.HIMOD) then
C Turn Loss Of Control In Demand Mode error message OFF
                CALL ONLOC
              endif
              PRVSMOD=CURMOD
              NXTMOD=MODD
C Call RMC (recomended mode changes)
              CALL RMC
              PROCF=1
```

```
              GOTO 200
            endif
         else
C Turn Demand Mode Not Currently Achievable error message ON
            CALL ONDMNCA
              if (MODD. EQ. CURMOD) then
C Turn Loss of Control In Demand Mode error message ON
201           CALL ONLOC
              PRVSMOD=CURMOD
              NXTMOD=HIMOD
              CALL RMC
              PROCF=0
              RETURN
            else
              if (CURMOD. GT. HIMOD) GOTO 201
C Turn Loss of Control in Demand Mode error message OFF
              CALL OFFLOC
              PRVSMOD=CURMOD
              NXTMOD-HIMOD
              CALL RMC
              PROCF=0
              RETURN
            endif
         endif
200      CONTINUE
         WRITE(OUT, 915) CURMOD, MODD, PRVSMOD, NXTMOD, HIMOD
915      FORMAT(' 2.3.2 CURMOD=',14,' MODD=',14,' PRVSMOD=',
      +           14,' NXTMOD=',14,' HIMOD=',14)

C** 2.4 Select optimal transition **
C** (determine the best transition from one mode to the next)
         if (NXTMOD. EQ. SSU) MOD=1
         if (NXTMOD. EQ. SMM) MOD=2
         if (NXTMOD. EQ. SLP) MOD=3
         if (NXTMOD. EQ. SSD) MOD=4
C
         DO Y=1,18
           BST(Y,1) = 0
           BST(Y,2) = 0
           BST(Y,3) = 0
           OTD(Y,1) = 0
           OTD(Y,2) = 0
           OTD(Y,3) = 0
         ENDDO
C
         CPID=0
         DO 501 NBR=1,NOF(MOD)
           NBRCHG=50
           STS=0
             DO 601 STS=1, NOS)MOD,NBR)
               CNG=0
               if (STS.GT.1) then IF(CMP.GT.NOC(MOD,NBR)) THEN
                   CMP=CMP-1
                   WRITE(OUT,37)CPID,CMP
37                 FORMAT*(' ***** RESET CPID FOR NEXT STATE, SPID =
```

```
                       ',14,
      +                       ' CMP= ',14)
                CPIC=C ID-CMP
              ELSE
                CPID=CPID-CMP
            endif
          ENDIF
          CMP=0
          DO 701 CMP=1, NOC(MOD,NBR)
            CPID=CPID+1
            if (VCS(CPID,EQ.ONE_ONE) TTT=1
            if (VCS(CPID).EQ.ONE_F) TTT=2
            if (VCS(CPID).EQ.ZERO_ZERO) TTT=3
            if (VCS(CPID).EQ.ONE_ZERO) TTT=4
            if (VCS(CPID.EQ.ZERO_ONE) TTT=5
            if (VCS(CPID).EQ.ZERO_F) TTT=6
            if )VCS(CPID).EQ.S_ZERO) TTT=7
            if (VCS(CPID).EQ.S_ONE) TTT=8
            if (VCS(CPID).EQ.S_F) TTT=9
            if (VCS(CPID).EQ.M_ZERO) TTT=10
            if (VCS(CPID).EQ.M_F) TTT=11
            if (VCS(CPID).EQ.P_ZERO) TTT=12
            if (VCS(CPID.EQ.P_ONE) TTT=13
            if (VCS(CPID).EQ.F_ZERO) TTT=14
            if (VCS(CPID.EQ.F_ONE) TTT=15
        WRITE(OUT,33) CPID,VCS(CPID),TTT,EX(CPID,STS,MOD)
33      FORMAT(//' CPID=',14,' VCS(CPID)=',14,'TTT=',14,
      +    ' ES(CPID,STS,MOD)=',14)
        WRITE(OUT,34) MOD, NBR,
NOF)MOD),STS,NOS(MOD,NBR),CMP,NOC(MOD,NBR)
34      FORMAT(' MOD= ',12,' NBR= ',13,'NOR(MOD)= ',14,/,
      +    ' STS= ',14,' NOC(MOD,NBR)= ',14,/,'CMP= ',14,
      +    ' NOC(MOD,NBR)= ',14)
        GOTO
        (801,802,803,804,805,806,807,808,809,810,811,812,813,814,815)
        TTT
C
C
C
801     CONTINUE
C**  VCS(CPID)=ONE_ONE) then
        if (ES(CPID,STS, MOD). EQ. ONE_ONE)then
          PROCK(CPID,1)=0
          GOTO 710
        endif
        if (ES(CPID,STS,MOD.EQ.ONE_F) GOTO 601
        if (ES(CPID,STS,MOD).EQ.ZERO_ZERO) then
          CNG=CNG+1
          PROCK(CPID,1)=1
          GOTO 710
        endif
        if (ES(CPID,STS,MOD).EQ.ZERO_ONE) GOTO 601
        if (ES(CPID,STS,MOD). EQ.ZERO_F) GOTO 601
        if (ES(CPID,STS,MOD). EQ.S_ZERO) then
          PROCK(CPID,1)=0
          CHG=CHG+1
          GOTO 710
```

```
          endif
          if (ES(CPID,STS,MOD).EQ.S_ONE then
            PROCK(CPID,1)=1
            CNG=CNG+1
            GOTO 710
          endif
          if (ES(CPID,STS,MOD). EQ.S_F) GOTO 601
          if (ES(CPID,STS,MOD). EQ.ZERO_ZERO) then
            CNG=CNG+1
            PROCK(CPID,1)=1
            GOTO 710
          endif
          if (ES(CPID, STS, MOD).EQ.ZERO_ONE) GOTO 601
          if (ES(CPID, STS, MOD).EQ.ZERO_F) GOTO 601
          if (ES(CPID, STS, MOD).EQ.S_ZERO then
            PROCK(CPID,1)=0
            CNG=CHG+1
            GOTO 710
          endif
          if (ES(CPID, STS, MOD).EQ.S_ONE) then
            PROCK(CPID,1)=1
            CHG=CNG+1
            GOTO 710
          endif
          if (ES(CPID,STS,MOD). EQS_F) GOTO 601
          if (ES(CPID, STS, MOD).EQ.M_ZERO) then
            PROCK(CPID,1)=0
            CHG=CHG+1
            GOTO 710
          endif
          if (ES(CPID, STS, MOD).EQ.M_F) GOTO 601
          if (ES(CPID, STS, MOD).EQ.ONE_ZERO) GOTO 601
          if (ES(CPID, STS, MOD).EQ.P_ZERO) GOTO 601
          if (ES(CPID, STS, MOD).EQ.P_ONE) GOTO 601
          if (ES(CPID, STS, MOD).EQ.R_ZERO GOTO 601
          if (ES(CPID, STS, MOD).EQ.F_ONE) GOTO 601
C**       VCS(CPID)=ONE_F
802       CONTINUE
          if (ES(CPID, STS, MOD).EQ.ONE_ONE) GOTO 601
          if (ES(CPID, STS, MOD).EQ.ONE_F) then
            PROCK)CPID,1)=0
            GOTO 710
          endif
          if (ES(CPID, STS, MOD).EQ.ZERO_ZERO) GOTO 601
          if (ES(CPID, STS, MOD).EQ.ZERO_ONE) GOTO 601
          if (ES(CPID, STS, MOD).EQ.ZERO_F) then
            PROCK(CPID,1)=1
            CHG=CHG+1
            GOTO 710
          endif
          if (ES(CPID, STS, MOD).EQ.S_ZERO) GOTO 601
          if (ES(CPID, STS, MOD).EQ.S_ONE) GOTO 601
          if (ES(CPID, STS, MOD).EQ.S_F) then
            PROCK(CPID,1)=0
            CHG=CHG+1
            GOTO 710
          endif
```

```
            if (ES(CPID, STS, MOD).EQ.M_ZERO GOTO 601
            if (ES(CPID, STS, MOD).EQ.M_F) then
              PROCK(CPID,A)=1
              CHG=CHG+1
              GOTO 710
            endif
            if (ES(CPID, STS, MOD).EQ.ONE_ZERO) GOTO 601
            if (ES(CPID, STS, MOD).EQ.P_ZERO) GOTO 601
            if (ES(CPID, STS, MOD).EQ.P_ONE) GOTO 601
            if (ES(CPID, STS, MOD).EQ.F_ZERO) GOTO 601
            if (ES(CPID, STS, MOD).EQ.F_ONE) GOTO 601
C
C**     VCS(CPID)=ZERO_ZERO
803         CONTINUE
            if (ES(CPID, STS, MOD).EQ.ONE_ONE) then
              PROCK(CPID,1)=1
              CHG=CHG+1
              GOTO 710
            endif
            if (ES(CPID, STS, MOD).EQ.ONE_F) GOTO 601
            if (ES(CPID, STS, MOD).EQ.ZERO_ZERO)then
              PROCK)CPID,1)=0
              GOTO 710
            endif
            if (ES(CPID, STS, MOD).EQ.ZERO_ONE) GOTO 601
            if (ES(CPID, STS, MOD).EQ.ZERO_F) GOTO 601
            if (ES(CPID, STS, MOD).EQ.S_ZERO) then
              PROCK(CPID,1)=0
              CHG=CHG+1
              GOTO 710
            endif
            if (ES(CPID,STS,MOD),EQ.S_ONE) then
              PROCK(CPID,1)=1
              CHG=CHG+1
              GOTO 710
            endif
            if (ES(CPID, STS, MOD).EQ.S_F) GOTO 601
            if (ES(CPID, STS, MOD).EQ.M_ZERO) then
              PROCK(CPID,1)-0
              CHG=CHG+1
              GOTO 710
            endif
            if (ES(CPID, STS, MOD).EQ.M_F GOTO 601
            if (ES(CPID, STS, MOD).EQ.ONE_ZERO) GOTO 601
            if (ES(CPID, STS, MOD).EQ.P_ZERO) GOTO 601
            if (ES(CPID, STS, MOD).EQ.P_ONE) GOTO 601
            if (ES(CPID, STS, MOD).EQ.F_ZERO) GOTO 601
            if (ES(CPID, STS, MOD).EQ.F_ONE) GOTO 601
            if (ES(CPID, STS, MOD).EQ.F_ONE) GOTO 601
C
C**VCS(CPID)=ONE_ZERO
804         CONTINUE
C
            if (ES(CPID, STS, MOD).EQ.ONE_ONE) GOTO 601
            if (ES(CPID, STS, MOD).EQ.ONE_F) GOTO 601
            if (ES(CPID, STS, MOD).EQ.ZERO_ZERO) then
              PROCK(CPID,1)=1
```

```
              CHG=CHG+1
              GOTO 710
           endif
           if (ES(CPID, STS, MOD).EQ.ONE_ONE) GOTO 601
           if (ES(CPID, STS, MOD).EQ.ONE_F) GOTO 601
           if (ES(CPID, STS, MOD).EQ.ZERO_ZERO) then
              PROCK(CPID,1)=1
              CHG=CHG+1
              GOTO 710
           endif
           if (ES(CPID, STS, MOD).EQ.ZERO_ONE) GOTO 601
           if (ES(CPID, STS, MOD).EQ.ZERO_F) GOTO 601
           if (ES(CPID, STS, MOD).EQ.S_ZERO) then
              PROCK(CPID,1)=0
              CHG=CHG+1
              GOTO 710
           endif
           if (ES(CPID, STS, MOD).EQ.S_ONE) GOTO 601
           if (ES(CPID, STS, MOD).EQ.S_F) GOTO 601
           if (ES(CPID, STS, MOD).EQ.m_ZERO) then
              PROCK(CPID,1)=0
              GOTO 710
           endif
           if (ES(CPID, STS, MOD).EQ.M_F) GOTO 601
           if (ES(CPID, STS, MOD).EQ.ONE_ZERO) then
              PROCK(CPID,1)=1
              GOTO 710
           endif
           if (ES(CPID, STS, MOD).EQ.P_ZERO) GOTO 601
           if (ES(CPID, STS, MOD).EQ.P_ONE) GOTO 601
           if (ES(CPID, STS, MOD).EQ.F_ZERO) GOTO 601
           if (ES(CPID, STS, MOD).EQ.F_ONE) GOTO 601
C
C**     VCS(CPID)=ZERO_ONE
805        CONTINUE
C
           if (ES(CPID, STS, MOD).EQ.ONE-ONE) GOTO 601
           if (ES(CPID, STS, MOD).EQ.ZERO_ZERO)GOTO 601
           if (ES(CPID, STS, MOD).EQ.ZERO_ONE)then
              PROCK(CPID,1)=0
              GOTO 710
           endif
           if (ES(CPID, STS, MOD).EQ.ZERO_F) GOTO 601
           if (ES(CPID, STS, MOD).EQ.S_ZERO) GOTO 601
           if (ES(CPID, STS, MOD).EQ.S_ONE) GOTO 601
           if (ES(CPID, STS, MOD).EQ.S_F) GOTO 601
           if (ES(CPID, STS, MOD).EQ.M_ZERO) GROTO 601
           if (ES(CPID, STS, MOD).EQ.M_F) then
              PROCK(CPID,1) =1
              CHG=CHG+1
              GOTO 710
           endif
           if (ES(CPID, STS, MOD).EQ.ONE_ZERO) GOTO 601
           if (ES(CPID, STS, MOD).EQ.P_ZERO) GOTO 601
           if (ES(CPID, STS, MOD).EQ.P_ONE) GOTO 601
           if (ES(CPID, STS, MOD).EQ.f_ZERO) GOTO 601
           if (ES(CPID, STS, MOD).EQ.F_ONE) GOTO 601
```

```
C
C**    VCS(CPID)=ZERO_F
806       CONTINUE
C
          if (ES(CPID, STS, MOD).EQ.ONE_ONE) GOTO 601
          if (ES(CPID, STS, MOD).EQ.ONE_F) then
            PROCK(CPID,1)=1
            CHG=CHG+1
            GOTO 710
          endif
          if (ES(CPID, STS, MOD).EQ.ZERO_ZERO) GOTO 601
          if (ES(CPID, STS, MOD).EQ.ZERO_ONE) GOTO 601
          if (ES(CPID, STS, MOD).EQ.ZERO_F) then
            PROCK(CPID,1)=0
            GOTO 710
          endif
          if (ES(CPID, STS, MOD).EQ.S_ZERO) GOTO 601
          if (ES(CPID, STS, MOD).EQ.S_ONE) GOTO 601
          if (ES(CPID, STS, MOD).EQ.S_F) then
            PROCK(CPID,1)=0
            CHG=CHG+1
            GOTO 710
          endif
          if (ES(CPID, STS, MOD).EQ.M_ZERO) GOTO 601
          if (ES(CPID, STS, MOD).EQ.P_ZERO GOTO 601
          if (ES(CPID, STS, MOD).EQ.P_ONE) GOTO 601
          if (ES(CPID, STS, MOD).EQ.F_ONE) GOTO 601
C
C**    VCS(CPID)=S_ZERO
807       CONTINUE
C
          if (ES(CPID, STS, MOD).EQ.ONE_ONE) then
            PROCK(CPID.1)=1
            CHG=CHG+1
            GOTO 710
          endif
          if (ES(CPID, STS, MOD).EQ.ONE_F) GOTO 601
          if (ES(STS,CMP,MOP_.EQ.ZERO_ZERO) then
            PROCK(CPID,1=1
            CHG=CHG+1
            GOTO 710
          endif
          if (ES(CPID, STS, MOD).EQ.ZERO_ONE) GOTO 601
          if (ES(CPID, STS, MOD).EQ.ZERO_F) GOTO 601
          if (ES(CPID, STS, MOD).EQ.S_ZERO) then
            PROCK(CPID,1)=0
            GOTO 710
          endiff
          if (ES(CPID, STS, MOD).EQ.S_ONE) then
            PROCK(CPID,1)=1
          CHG=CHG+1
          endiff
          if (ES(CPID, STS, MOD).EQ.S_F) GOTO 601
          if (ES(CPID, STS, MOD).EQ.M_ZERO) then
            PROCK(CPID,a)=0
            CHG=CHG+1
            GOTO 710
```

```
            endif
            if (ES(CPID, STS, MOD).EQ.M_F) GOTO 601
            if (ES(CPID, STS, MOD).EQ.ONE_ZERO) GOTO 601
            if (ES(CPID, STS, MOD).EQ.P_ZERO) GOTO 601
            if (ES(CPID, STS, MOD).EQ.P_ONE) GOTO 601
            if (ES(CPID, STS, MOD).EQ.F_ZERO) GOTO 601
C
C**   VCS(CPID=S_ONE
808         CONTINUE
            If (ES(CPID,STS,MOD) EQ. ONE_ONE3 then
              PROCK(CPID,1=1
              CHG=CHG+1
              GOTO 710
            endif
            if (ES(CPID, STS, MOD).EQ.ONE_F) GOTO 601
            if (ES(CPID, STS, MOD).EQ.ZERO_F) GOTO 601
            if (ES(CPID, STS, MOD).EQ.S_ZERO) then
              PROCK(CPID,1)=0
              CHG=CHG+1
              GOTO 710
            endif
            if (ES(CPID, STS, MOD).EQ.S_ONE) then
                PROCK(CPIAD,1)=0
                GOTO 710
              end if
            if (ES(CPID, STS, MOD).EQ.S_F) GOTO 601
            if (ES(CPID, STS, MOD).EQ.M_ZERO) then
              PROCK(CPID,1)=0
              CHG=CHG+1
              GOTO 710
            endif
            if (ES(CPID, STS, MOD).EQ.M_F) GOTO 601
            if (ES(CPID, STS, MOD).EQ.ONE_ZERO) GOTO 601
            if (ES(CPID, STS, MOD).EQ.P_ZERO) GOTO 601
            if (ES(CPID, STS, MOD).EQ.P_ONE) GOTO 601
            if (ES(CPID, STS, MOD).EQ.F_ZERO) GOTO 601
            if (ES(CPID, STS, MOD).EQ.F_ONE) GOTO 601
C
C**   VCS(CPID)=S_F
809         CONTINUE
C
            if (ES(CPID, STS, MOD).EQ.ONE_ONE) GOTO 601
            if (ES(CPID, STS, MOD).EQ.ONE_F) then
              PROCK(CPID,1)=1
              CHG=CHG+1
              GOTO 710
            endif
            if (ES(CPID, STS, MOD).EQ.ZERO_ZERO) GOTO 601
            if (ES(CPID, STS, MOD).EQ.ZERO_ONE) GOTO 601
            if (ES(CPID, STS, MOD).EQ.ZERO_F) then
              PROCK(CPID,1)=1
              CHG=CHG+1
              GOTO 710
            endif
            if (ES(CPID, STS, MOD).EQ.S_ZERO) GOTO 601
            if (ES(CPID, STS, MOD).EQ.S_ONE) GOTO 601
            if (ES(CPID, STS, MOD).EQ.S_F) then
```

```
          PROCK(CPID,1)=0
          GOTO 710
       endif
       if (ES(CPID, STS, MOD).EQ.M_ZERO) GOTO 601
       if (ES(CPID, STS, MOD).EQ.M_F) then
          PROCK(CPID,1)=1
          CHG=CHG+1
          GOTO 710
       endif
       if (ES(CPID, STS, MOD).EQ.ONE_ZERO) GOTO 601
       if (ES(CPID, STS, MOD).EQ.P-ZERO) GOTO 601
       if (ES(CPID, STS, MOD).EQ.P_ONE) GOTO 601
       if (ES(CPID, STS, MOD).EQ.F_ZERO) GOTO 601
       if (ES(CPID, STS, MOD).EQ.F_ONE) GOTO 601
C
C**VCS(CPID)=M_ZERO
810    CONTINUE
C
       if (ES(CPID, STS, MOD).EQ.ONE_ONE) then
          PROCK(CPID,1)=1
          CHG=CHG+1
          GOTO 710
       endif
       if (ES(CPID, STS, MOD).EQ.ONE_F) GOTO 601
       if (ES(CPID, STS, MOD).EQ.ZERO_ZERO) then
          PROCK(CPID,1)=1
          CHG=CHG+1
          GOTO 710
       endif
       if (ES(CPID, STS, MOD).EQ.ZERO_ONE) GOTO 601
       if (ES(CPID, STS, MOD).EQ.ZERO_F) GOTO 601
       if (ES(CPID, STS, MOD).EQ.S_ZERO) then
          PROCK(CPID,1)=1
          CHG=CHG+1
          GOTO 710
       endif
       if (ES(CPID, STS, MOD).EQ.S_ONE) then
          PROCK(CPID,1)=1
          CHG=CHG+1
          GOTO 710
       endif
       if (ES(CPID, STS, MOD).EQ.S_F) GOTO 601
       if (ES(CPID, STS, MOD).EQ.M-h) then
          PROCK(CPID,1)=0
          GOTO 710
       endif
       if (ES(CPID, STS, MOD).EQ.M_F) GOTO 601
       if (ES(CPID, STS, MOD).EQ.ONE_ZERO) GOTO 601
       if (ES(CPID, STS, MOD).EQ.P_ZERO) then
          PROCK(CPID,1)=1
          CHG=CHG+1
          GOTO 710
       endif
       if (ES(CPID, STS, MOD).EQ.P_ONE) then
          PROCK(CPID,1)=1
          CHG=CHG+1
          GOTO 710
```

```
          endif
          if (ES(CPID, STS, MOD).EQ.F_ZERO) GOTO 601
          if (ES(CPID, STS, MOD).EQ.F_ONE) GOTO 601
C
C**   VCS(CPID)=M_F
811       CONTINUE
C
          if (ES(CPID, STS, MOD).EQ.ONE_ONE) GOTO 601
          if (ES(CPID, STS, MOD).EQ.ONE_F) then
            PROCK(CPID,1)=1
            CHG=CHG+1
            GOTO 710
          endif
          if (ES(CPID, STS, MOD).EQ.ZERO_ZERO) GOTO 601
          if (ES(CPID, STS, MOD).EQ.ZERO_ONE) GOTO 601
          if (ES(CPID, STS, MOD).EQ.ZERO_F) then
            PROCK(CPID,1)=1
            CHG=CHG+1
            GOTO 710
          endif
          if (ES(CPID, STS, MOD).EQ.S_ZERO) GOTO 601
          if (ES(CPID, STS, MOD).EQ.S_ONE) GOTO 601
          if (ES(CPID, STS, MOD).EQ.S_F) then
            PROCK(CPID,1)=1
            CHG=CHG+1
            GOTO 710
          endif
          if (ES(CPID, STS, MOD).EQ.M+ZERO) then
            PROCK(CPID,1)=1
            CHG=CHG+1
            GOTO 710
          endif
          if (ES(CPID, STS, MOD).EQ.M_F) then
            PROCK(CPID,1)=1
            GOTO 710
          endif
          if (ES(CPID, STS, MOD).EQ.ONE_ZERO) GOTO 601
          if (ES(CPID, STS, MOD).EQ.P_ZERO) GOTO 601
          if (ES(CPID, STS, MOD).EQ.P_ONE) GOTO 601
          if (ES(CPID, STS, MOD).EQ.F_ZERO) GOTO 601
          if (ES(CPID, STS, MOD).EQ.F_ONE) GOTO 601
C
C**   VCS(CPID)=P_ZERO
812       CONTINUE
C
          if (ES(CPID, STS, MOD).EQ.ONE_ONE) GOTO 601
          if (ES(CPID, STS, MOD).EQ.ONE_F) GOTO 601
          if (ES(CPID, STS, MOD).EQ.ZERO_ZERO) GOTO 601
          if (ES(CPID, STS, MOD).EQ.ZERO_ONE) GOTO 601
          if (ES(CPID, STS, MOD).EQ.ZERO_F) GOTO 601
          if (ES(CPID, STS, MOD).EQ.S_ZERO) GOTO 601
          if (ES(CPID, STS, MOD).EQ.S_ONE) GOTO 601
          if (ES(CPID, STS, MOD).EQ.S_F GOTO 601
          if (ES(CPID, STS, MOD).EQ.M_ZERO) then
            PROCK(CPID,1)=1
            CHG=CHG+1
            GOTO 710
```

```
              endif
              if (ES(CPID, STS, MOD).EQ.M_F) GOTO 601
              if (ES(CPID, STS, MOD).EQ.ONE_ZERO) GOTO 601
              if (ES(CPID, STS, MOD).EQ.P_ZERO) then
                 PROCK(CPID,1)=1
                 GOTO 710
              endif
              if (ES(CPID, STS, MOD).EQ.P_ONE) then
                 PROCK(CPID,1)=1
                 CHG=CHG+1
                 GOTO 710
              endif
              if (ES(CPID, STS, MOD).EQ.F_ZERO) GOTO 601
              if (ES(CPID, STS, MOD).EQ.F_ONE) GOTO 601
C
C**VCS(CPID)=P_ONE
813           CONTINUE
C
              if (ES(CPID, STS, MOD).EQ.ONE_ONE) GOTO 601
              if (ES(CPID, STS, MOD).EQ.ONE_F) GOTO 601
              if (ES(CPID, STS, MOD).EQ.ZERO_ZERO) GOTO 601
              if (ES(CPID, STS, MOD).EQ.ZERO_ONE) GOTO 601
              if (ES(CPID, STS, MOD).EQ.ZERO_F) GOTO 601
              if (ES(CPID, STS, MOD).EQ.S_ZERO) GOTO 601
              if (ES(CPID, STS, MOD).EQ.S_ONE) GOTO 601
              if (ES(CPID, STS, MOD).EQ.S_F) GOTO 601
              if (ES(CPID, STS, MOD).EQ.M_ZERO) then
                 PROCK(CPID,1)=0
                 CHG=CHG+1
                 GOTO 710
              endif
              if (ES(CPID, STS, MOD).EQ.M_F GOTO 601
              if (ES(CPID, STS, MOD).EQ.ONE_ZERO) GOTO 601
              if (ES(CPID, STS, MOD).EQ.P_ZERO) then
                 PROCK(CPID,1)=1
                 CHG=CHG+1
                 GOTO 710
              endif
              if (ES(CPID, STS, MOD).EQ.P_ONE) then
                 PROCK(CPID,1)=1
                 GOTO 710
              endif
              if (ES(CPID, STS, MOD).EQ.F_ZERO) GOTO 601
              if (ES(CPID, STS, MOD).EQ.F_ONE) GOTO 601
C
C**   VCS(CPID)=F_ZERO
814
C
              if (ES(CPID, STS, MOD).EQ.ONE_ONE) GOTO 601
              if (ES(CPID, STS, MOD).EQ.ONE_F) GOTO 601
              if (ES(CPID, STS, MOD).EQ.ZERO_ZERO) GOTO 601
              if (ES(CPID, STS, MOD).EQ.ZERO_ONE) GOTO 601
              if (ES(CPID, STS, MOD).EQ.S_ZERO) GOTO 601
              if (ES(CPID, STS, MOD).EQ.S_ONE) GOTO 601
              if (ES(CPID, STS, MOD).EQ.S_F) GOTO 601
              if (ES(CPID, STS, MOD).EQ.M_ZERO) GOTO 601
              if (ES(CPID, STS, MOD).EQ.M_F) then
                 PROCK(CPID,1)=1
```

```
              CHG=CHG+1
              GOTO 710
           endif
           if (ES(CPID, STS, MOD).EQ.ONE_ZERO) GOTO 601
           if (ES(CPID, STS, MOD).EQ.P_ZERO) GOTO 601
           if (ES(CPID, STS, MOD).EQ.P_ONE) GOTO 601
           if (ES(CPID, STS, MOD).EQ.F_ZERO) then
              PROCK(CPID,1)=1
              GOTO 710
           endif
           if (ES(CPID, STS, MOD).EQ.F_ONE) GOTO 601
C
C**  VCS(CPID)=F_ONE
815        CONTINUE
C
           if (ES(CPID, STS, MOD).EQ.ONE_ONE) GOTO 601
           if (ES(CPID, STS, MOD).EQ.ONE_F) GOTO 601
           if (ES(CPID, STS, MOD).EQ.ZERO_ZERO) GOTO 601
           if (ES(CPID, STS, MOD).EQ.ZERO_ONE) GOTO 601
           if (ES(CPID, STS, MOD).EQ.ZERO_F) GOTO 601
           if (ES(CPID, STS, MOD).EQ.S_ZERO) GOTO 601
           if (ES(CPID, STS, MOD).EQ.S_ONE) GOTO 601
           if (ES(CPID, STS, MOD).EQ.S_F) GOTO 601
           if (ES(CPID, STS, MOD).EQ.M_ZERO) GOTO 601
           if (ES(CPID, STS, MOD).EQ.M_F) GOTO 601
              PROCK(CPID,1)=1
              CHG=CHG+1
              GOTO 710
           endif
           if (ES(CPID, STS, MOD).EQ.ONE_ZERO) GOTO 601
           if (ES(CPID, STS, MOD).EQ.P_ZERO) GOTO 601
           if (ES(CPID, STS, MOD).EQ.P_ONE) GOTO 601
           if (ES(CPID, STS, MOD).EQ.F_ZERO) GOTO 601
           if (ES(CPID, STS, MOD).EQ.F_ONE) then
              PROCK(CPID,1)=0
              GOTO 710
           endif
C
C
C
C
C
710        CONTINUE
           PROCK(CPID,2)=VCS(CPID)
           PROCK(CPID,3)=ES(CPID,STS,MOD)
C
701        CONTINUE
C
C**  Determine optimal transition for function
C          if (NBRCNG.GT.CHG) then
           NBRCING=CNG
              DO 755 X=XX,CPID
              BST(X,1)=PROCK(X,1)
              BST(X,2)=PROCK(X,2)
              if (PROCK(X,3).EQ.0) GOTO 975
              BST(X,3)=PROCK(X,3)
755        CONTINUE
```

```
              endif
              if (NBRCNG.EQ.0) GOTO 501
C
601           CONTINUE
              if (STS,GT,NOS(MOD,NBR)) then
                 if (CMP.LE.NOC(MOD,NBR)) then
                    CPIC=CPID-CMP+NOC(MOD,NBR)
                 endif
              endif
C
501           CONTINUE
C
              TC=0
              DO 950 CPIC=1,18
                 if (BST(CPID,1).EQ.1) then
                    TC = TC+1
                    OTD(TC,1) = CPID
                    OTD(TC,2) = BST(CPID,2)
                    OTD(TC,3) = BST)CPID,3)
                    WRITE(OUT,29) TC,OTD(TC,1), OTD(TC,3),CPID,
     +                            BST(CPID,1),BST(CPID,2),BST(CPID,3)
29                  FORMAT(' TC=',13,' OTD(TC,1)=',14,' OTE(TC,2)=',14,
     +              ' OTD(TC,3)=',14,/,' CPID=',13,' BSTCPID,1)=',14,
     + '            BST(CPID,2)=',14,'  BST(CPID),3)=',14)
                 endif
950           CONTINUE
              if (TC.EQ.0) then
                 PROCF=0
                 CALL RMC
                 CURMOD=NXTMOD
                 CALL OFFLOC
              else
                 PROCF=1
                 CALL ONLOC
              endif
              RETURN
975           CONTINUE
C
C***              No established state has been found    ****
C
              WRITE(OUT,980)
980           FORMAT('   ***** NO ESTABLISH STATE HAS BEEN FOUND *****')
C
              RETURN
              END
```

The foregoing description of a preferred embodiment of the inventor has been presented for purposes of illustration and description and is not intended to be exhaustive or to hurt the invention to the precise form disclosed. It was chosen and described in order to best explain the principles of the invention and their practical application to thereby enable others skilled in the art to best utilize the invention in various embodiments and with various modifications as arts suited to the particular use contemplated. It is intended that the scope of the invention be defined by the claims appended hereto.

I claim:

1. A method of operating a nuclear reactor with the aid of a digital computer, comprising:
   (a) providing said computer with a data base including at least a list of safe reactor states, said safe reactor states being those combinations of individual reactor component states which are safe wherein said individual reactor components states are expressed as the binary notation (ab) where 'a' defines the status of the components control switch and 'b' defines the status of the component and wherein said list of safe reactor states is determined by combinatory logic operations upon said binary notation expression of said individual reactor component states, and a list of control instructions for achieving a safe reactor state;
   (b) repetitively determining the actual states of said individual reactor components;
   (c) repetitively providing the computer with said actual component states;
   (d) repetitively comparing in the computer said actual component states with said list of safe reactor states;
   (e) selecting in the computer operating instructions for achieving a safe reactor state from said list of control instructions when a said comparison indicates that said actual component states do not match a said safe reactor state; and
   (f) executing said operating instructions.

2. A method of operating with the aid of a digital computer a complex system having a large number of components, each component having several possible states wherein said component states are expressed as the binary notation (ab) where 'a' defines the status of the component's control switch and 'b' defines the status of the components and an actual state; the system having a very large number of possible states based on all the possible combinations of the possible states of each component, a smaller number of safe system states wherein said safe system states are determined by combinatorial logic operations upon said binary notation expression of said component states and an actual system state based on the actual state of the components, comprising:
   (a) providing said computer with a data base including at least a list of said safe system states and a list of control instructions for achieving a safe system state;
   (b) repetitively determining the actual states of said components;
   (c) repetitively providing the computer with said actual component states;
   (d) repetitively comparing in the computer said actual component states with said list of safe system states;
   (e) selecting in the computer operating instructions for achieving a safe system state from said list of control instructions when a said comparison indicates that said actual component states do not match a said safe system state; and
   (f) executing said operating instruction.

3. The method of claim 1 wherein the step of selecting in the computer operating instructions for achieving a safe system state comprises selecting those instructions which result in a minimum number of component changes in achieving a safe system state.

* * * * *